US012784293B2

(12) United States Patent
Tamagawa

(10) Patent No.: US 12,784,293 B2
(45) Date of Patent: Nov. 3, 2026

(54) IMAGE MANAGEMENT APPARATUS, IMAGE MANAGEMENT SYSTEM, AND IMAGE MANAGEMENT APPARATUS CONTROL METHOD

(71) Applicant: CANON KABUSHIKI KAISHA, Tokyo (JP)

(72) Inventor: Kei Tamagawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 18/733,165

(22) Filed: Jun. 4, 2024

(65) Prior Publication Data

US 2024/0412421 A1 Dec. 12, 2024

(30) Foreign Application Priority Data

Jun. 6, 2023 (JP) ................................ 2023-093148

(51) Int. Cl.
*G06T 11/00* (2026.01)

(52) U.S. Cl.
CPC .................................. *G06T 11/00* (2013.01)

(58) Field of Classification Search
CPC ...................................................... G06T 11/00
USPC ......................................................... 345/581
See application file for complete search history.

(56) References Cited

U.S. PATENT DOCUMENTS

2008/0129728 A1* 6/2008 Satoshi ..................... G06T 3/04 345/419
2011/0243372 A1* 10/2011 Li .......................... G06T 11/00 382/100
2021/0227129 A1* 7/2021 Honda .............. H04N 1/00204

FOREIGN PATENT DOCUMENTS

| | | | |
|---|---|---|---|
| EP | 1286536 | B1 | 12/2010 |
| EP | 3346702 | A1 | 7/2018 |
| JP | 4054629 | B2 | 2/2008 |
| JP | 2008199677 | A | 8/2008 |
| JP | 2018148475 | A | 9/2018 |

* cited by examiner

*Primary Examiner* — Hai Tao Sun
(74) *Attorney, Agent, or Firm* — Canon U.S.A., Inc. IP Division

(57) ABSTRACT

An image management apparatus includes a determination unit and a transfer unit. The determination unit is configured to determine a type of a target image represented by image data transmitted from an external apparatus. The transfer unit is configured to transfer, in a case where the type of the target image determined by the determination unit is an original image, the image data of the target image to an information management apparatus configured to generate, from an input image, a proxy image having a smaller amount of data than the input image.

16 Claims, 31 Drawing Sheets

FIG. 18

700

| IMAGE ID | IMAGE REFERENCE DESTINATION | ORIGINAL IMAGE FLAG |
|---|---|---|
| I001 | /usr001/2022/12/11/I001 | true |
| I002 | /usr001/2022/12/11/I002 | false |
| ... | ... | ... |

FIG. 25A

900

| DEVICE ID | MODEL ID | ... |
|---|---|---|
| DEV001 | MOD001 | ... |
| DEV002 | MOD002 | ... |
| ... | ... | ... |

FIG. 25B

901

| ATTRIBUTE ID | MODEL ID | HORIZONTAL RESOLUTION | VERTICAL RESOLUTION | BIT RATE |
|---|---|---|---|---|
| PRP001 | MOD001 | 2048 | 1080 | 9 |
| PRP002 | MOD001 | 1920 | 1080 | 9 |
| PRP003 | MOD001 | 1280 | 720 | 9 |
| PRP004 | MOD001 | 1280 | 720 | 6 |
| PRP005 | MOD002 | 1920 | 1080 | 16 |
| PRP006 | MOD002 | 1920 | 1080 | 9 |
| PRP007 | MOD002 | 1280 | 720 | 6 |
| ... | ... | ... | ... | ... |

IMAGE MANAGEMENT APPARATUS, IMAGE MANAGEMENT SYSTEM, AND IMAGE MANAGEMENT APPARATUS CONTROL METHOD

BACKGROUND OF THE INVENTION

Field of the Invention

The present disclosure relates to an image management apparatus, an image management system, and an image management apparatus control method.

Description of the Related Art

In recent years, the number of users of moving and still image (hereinafter referred to as "images" in general) sharing services has been increasing, and the number of image editors has been expanding. There are many situations where editing images (especially moving images) requires expensive computing resources. Thus, for example, in a case where editing is attempted using a computer that does not have sufficient performance, smooth playback may be difficult at the time of previewing images, or the image editing software or computer may stop responding, which may interfere with the image editing process.

To prevent such situations from occurring, an image (hereinafter referred to as a proxy image) obtained by further reducing the amount of data of an image, such as a proxy video in which the original moving image is encoded with high compression, may be used for editing. In a case where a proxy image is used to produce an image such as a moving image, for example, the proxy image is associated with the original image, operations related to editing are performed on the proxy image that is the target, and the results of the editing are reflected in the original image at a desired timing, such as at the time of encoding. Such a mechanism makes it possible to quickly obtain responses to image editing, and also makes it possible to obtain images (for example, moving images) with little degradation as a result of editing.

In a situation where a proxy image is generated each time an image is edited, there may be a waiting time for the generation of a proxy image before the start of editing of the image. On the basis of this background, in recent years, some image capturing apparatuses have been proposed that generate and record a proxy image when the original image is recorded. Note that, hereinafter, an original image from which a proxy image is generated is also referred to as an original image for convenience's sake.

In contrast, as a workflow for transferring images from an image capturing apparatus to an editing environment, there is a known method for importing images to the editor's computer through an intermediary server and an image management service.

The technologies disclosed in Japanese Patent Laid-Open No. 2008-199677 and Japanese Patent Laid-Open No. 2018-148475 are examples of technologies related to the transfer of images.

Japanese Patent Laid-Open No. 2008-199677 discloses a technology for generating and distributing a low-resolution moving image and a high-resolution moving image by inputting moving images captured by a camera into a high-compression encoder and a low-compression encoder, respectively, in a moving image distribution system using a network camera.

Japanese Patent Laid-Open No. 2018-148475 discloses a technology in which a server mediates the transfer of moving images from a moving image provider to users in a moving image intermediary sales system. In this technology, the moving image provider uploads both high-resolution moving images and proxy videos to the server from their own terminal. Thereafter, a user can view a proxy video and can download, after purchasing a desired moving image, the high-resolution moving image corresponding to the proxy video.

Some management services for images such as moving images have been proposed that automatically generate proxy images, such as proxy videos, when image uploads are accepted. When the data of an original image (original image data) and the data of a proxy image generated from the original image are transmitted to such a service, a situation can be envisioned where proxy images are generated and stored for each of the original image and the proxy image. In such situations, adverse effects may become apparent, such as overloading storage related to image management or an increase in the number of similar images more than necessary.

SUMMARY OF THE INVENTION

In light of the above-described problems, the present disclosure can effectively manage original images and proxy images in situations where proxy images can be generated from original images.

The present invention provides an image management apparatus including: a determination unit configured to determine a type of a target image represented by image data transmitted from an external apparatus, and a transfer unit configured to transfer, in a case where the type of the target image determined by the determination unit is an original image, the image data of the target image to an information management apparatus configured to generate, from an input image, a proxy image having a smaller amount of data than the input image.

Further features of the present invention will become apparent from the following description of exemplary embodiments with reference to the attached drawings.

BRIEF DESCRIPTION OF THE DRAWINGS

FIG. 18 is a diagram illustrating an example of the configuration of a management table.

FIGS. 25A and 25B are diagrams illustrating examples of management tables.

DESCRIPTION OF THE EMBODIMENTS

Figure 1:
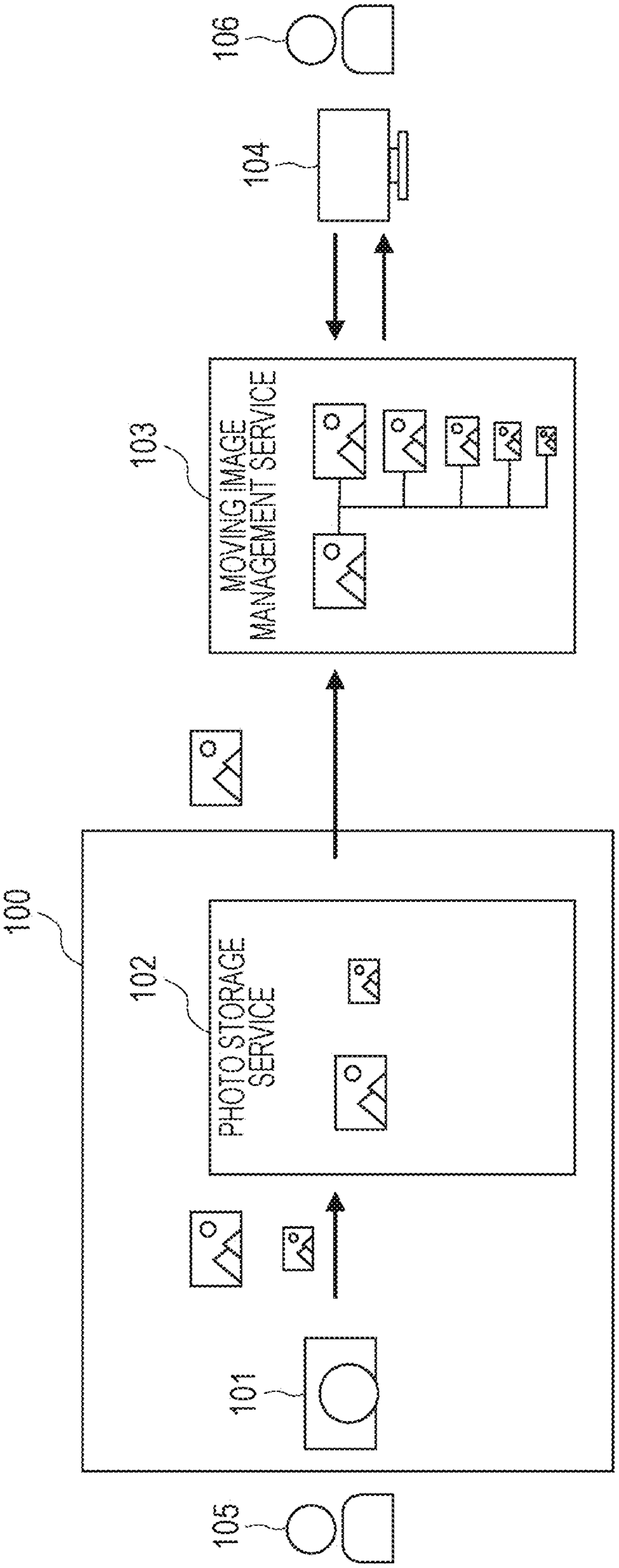
FIG. 1 is a schematic diagram illustrating an image management system.

The following is a detailed description of embodiments of the present disclosure with reference to the attached drawings.

Note that constructional elements having substantially identical functional configurations will be denoted by the same symbols in the present specification and the drawings, and redundant description will be omitted. The configurations illustrated in the following embodiments are only examples, and the present disclosure is not limited to the configurations illustrated in the drawings.

First Embodiment

In the following, a first embodiment of the present disclosure will be described.

(Summary of Image Management System)

With reference to FIG. 1, an example of an image management system 100 according to an embodiment of the present disclosure will be summarized. The image management system 100 according to the present embodiment includes an image capturing apparatus 101 and a photo storage service 102.

The image capturing apparatus 101 has the function of capturing images of subjects and generating data of still and moving images based on the results of the image capturing. Moreover, the image capturing apparatus 101 has a communication function and can transmit and receive various data (for example, image data corresponding to the results of image capturing or the like) by communicating with external devices and services, such as the photo storage service 102.

The photo storage service 102 has a communication function and can transmit and receive various data by communicating with external devices and services, such as the image capturing apparatus 101 and a moving image management service 103 which will be described later. Moreover, the photo storage service 102 acquires image data of moving images and still images from the image capturing apparatus 101 and manages these image data.

The moving image management service 103 has a communication function and can transmit and receive various data (for example, image data or the like) by communication with external devices and services, such as the photo storage service 102 and a terminal 104 which will be described later.

The terminal 104 has a communication function and can transmit and receive various data by communication with external devices and services, such as the moving image management service 103 and so forth. The terminal 104 can be realized by a terminal device, examples of which include a personal computer (PC), a smartphone, and a tablet terminal.

A user denoted by a sign 105 schematically represents a user who uses the image capturing apparatus 101 and the photo storage service 102. Moreover, the user 105 may have an account registered in the moving image management service 103 as a user of the moving image management service 103.

A user denoted by a sign 106 schematically represents a user (an editor) who edits moving images and still images using the terminal 104. Moreover, the user 106 may have an account registered in the moving image management service 103 as a user of the moving image management service 103.

The schematic operation of the image management system 100 according to the present embodiment will be described below.

Suppose that the user 105 (for example, a photographer) turns on the power of the image capturing apparatus 101 and issues an instruction to the image capturing apparatus 101 to transmit the data of an image stored in the image capturing apparatus 101 to the photo storage service 102.

The image capturing apparatus 101 transmits, on the basis of the instruction from the user 105, the image data stored in the image capturing apparatus 101 (for example, the image data of a moving image or a still image) to the photo storage service 102.

When the photo storage service 102 receives the image data from the image capturing apparatus 101, the photo storage service 102 stores the image data and thereafter transfers the image data to the moving image management service 103.

The moving image management service 103 has the function of generating proxy images for input images.

As a specific example, when the moving image management service 103 receives image data from the photo storage service 102, the moving image management service 103 stores the image data and also generates a proxy image (for example, a proxy video or the like) of the image represented by the image data. The moving image management service 103 stores the image data of the generated proxy image in association with the image data of the image from which the proxy image was generated.

Next, suppose that the user 106, who is an editor, has instructed the terminal 104 to acquire an image (for example, a moving image) stored in the moving image management service 103.

The terminal 104 requests, on the basis of the instruction from the user 106, the moving image management service 103 to transmit the image data corresponding to the image specified by the user 106.

The moving image management service 103 transmits the specified image data to the terminal 104 in accordance with the transmission request from the terminal 104.

When the terminal 104 receives the image data from the moving image management service 103, the terminal 104 stores the image data in a predetermined storage. This allows the user 106 to edit, using image editing software or the like, the image (for example, a moving image) represented by the image data stored in the storage of the terminal 104.

(System Configuration of Image Management System)

Figure 2:
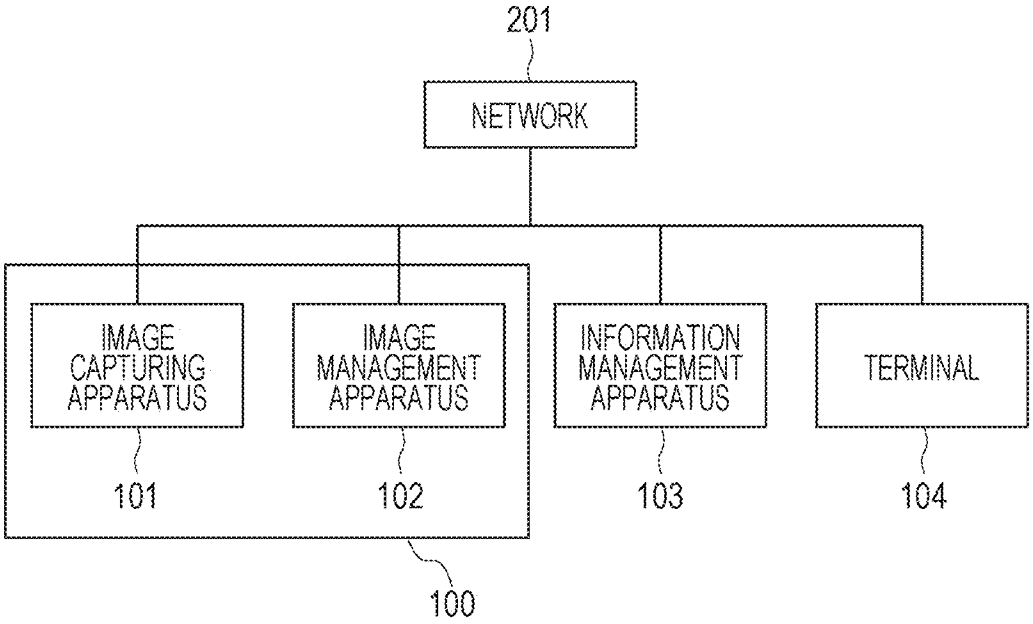
FIG. 2 is a diagram illustrating an example of a system configuration of the image management system.

With reference to FIG. 2, an example of the system configuration of the image management system 100 according to the present embodiment will be described.

The image management system 100 includes an image capturing apparatus 101 and an image management apparatus 102. The image management apparatus 102 corresponds to the photo storage service 102 in the example illustrated in FIG. 1 (in other words, an information processing apparatus for realizing the photo storage service 102). In addition, as the configuration related to the image management system 100, an information management apparatus 103, a terminal 104, and a network 201 are illustrated. The information management apparatus 103 corresponds to the moving image management service 103 in the example illustrated in FIG. 1 (in other words, an information processing apparatus for realizing the moving image management service 103). The image capturing apparatus 101, the image management apparatus 102, the information management apparatus 103, and the terminal 104 illustrated in FIG. 2 correspond to the image capturing apparatus 101, the photo storage service 102, the moving image management service 103, and the terminal 104, respectively, in the example illustrated in FIG. 1.

The image capturing apparatus 101, the image management apparatus 102, the information management apparatus 103, and the terminal 104 are connected to each other via the network 201 such that data can be transmitted to and received from each other. Note that the type of network used as the network 201 is not specifically limited. For example, a local area network (LAN), the Internet, or the like may be used as the network 201.

As the image capturing apparatus 101, for example, an interchangeable lens digital camera with communication functions can be used. As a matter of course, devices usable as the image capturing apparatus 101 are not limited to interchangeable lens digital cameras. As a specific example, any terminal capable of transmitting image data to the image management apparatus 102, such as a compact digital camera with communication functions, a smartphone, a tablet terminal, or a PC, can be used as a constructional device corresponding to the image capturing apparatus 101. In the present embodiment, description will focus mainly on the case of so-called "captured images" corresponding to the results of image capturing; however, the images to be processed by the image management system according to the present embodiment are not necessarily limited to captured images only. Thus, in a case where other images other than the captured images are to be processed, the constructional device corresponding to the image capturing apparatus 101 does not necessarily have an image capturing function.

(Hardware Configuration of Image Capturing Apparatus)

Figure 3:
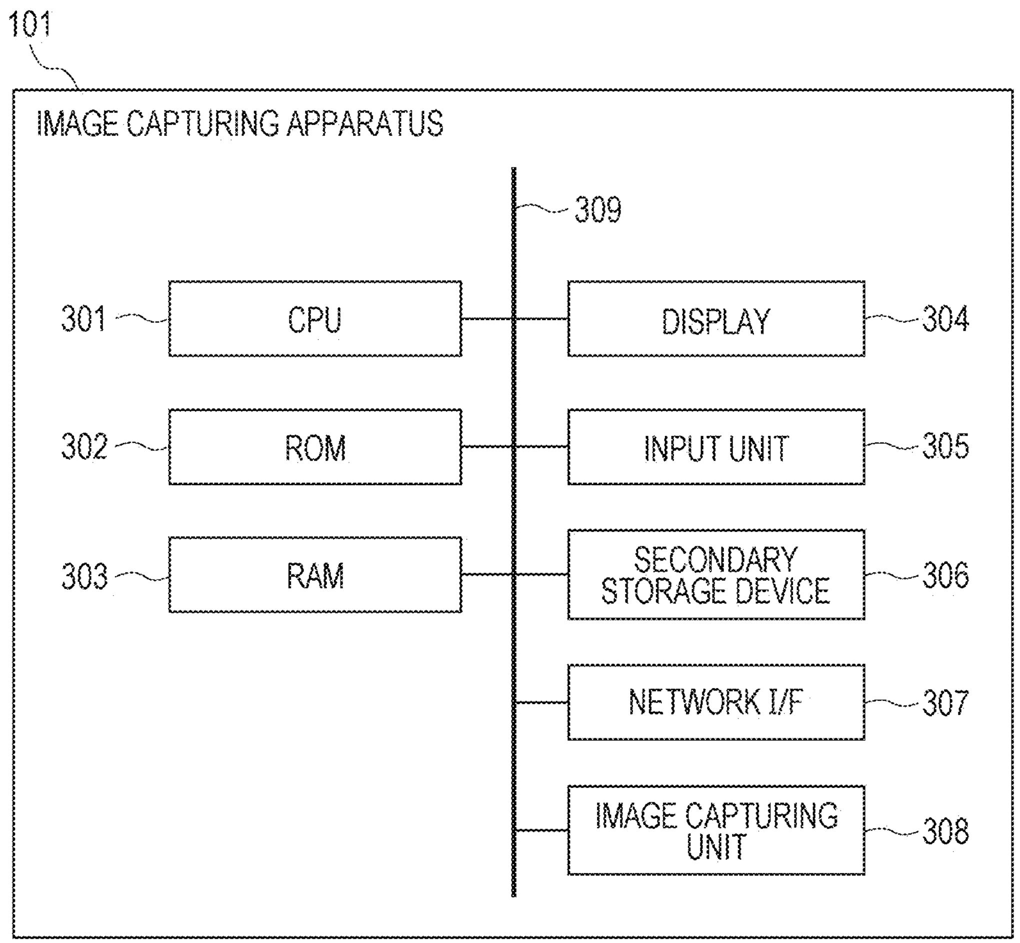
FIG. 3 is a diagram illustrating an example of a hardware configuration of an image capturing apparatus.

With reference to FIG. 3, an example of the hardware configuration of the image capturing apparatus 101 will be described. The image capturing apparatus 101 includes a central processing unit (CPU) 301, a read-only memory (ROM) 302, and a random access memory (RAM) 303. The image capturing apparatus 101 also includes a display 304, an input unit 305, a secondary storage device 306, a network interface (I/F) 307, and an image capturing unit 308. The series of constructional elements of the image capturing apparatus 101 described above as examples are connected via a bus 309 such that information can be transmitted to and received from each other.

The use of an interchangeable lens digital camera or a compact digital camera is mainly assumed as the image capturing apparatus 101; however, the image capturing apparatus 101 is not limited only to such a so-called image capturing apparatus. For example, a smartphone or tablet terminal that has an image capturing function can also be used.

The CPU 301 is an arithmetic processing device that executes programs stored in the ROM 302 and the secondary storage device 306 to control the individual units connected via the bus 309. The ROM 302 is a read-only memory that stores the operating system (OS) and so forth. The RAM 303 is a memory that temporarily stores data when the CPU 301 performs arithmetic processing.

The display 304 is a display device that presents various types of information, such as captured images and various user interface (UI) screens, to the user by displaying the information in a predetermined display region. The input unit 305 is realized by buttons, a touch panel, and a microphone, for example, and is an input device for accepting, from the user, various operations related to image capturing instructions, various setting instructions, and so forth.

The secondary storage device 306 is a storage area used to store various programs, captured image data, and setting values of image capturing settings included in the accompanying information. Note that the image capturing settings may include settings for ISO sensitivity, shutter speed, exposure compensation, f-number, and so forth.

The network I/F 307 is a network interface for connecting the image capturing apparatus 101 to networks, such as a local area network (LAN), an intranet, and the Internet. Note that the configuration of the network I/F 307 may be changed as necessary in accordance with the type of network to be connected and a communication method to be used.

The image capturing unit 308 is a module that converts light received by an imaging device such as a charge-coupled device (CCD) or a complementary metal-oxide-semiconductor (CMOS) into an electrical signal and records the electrical signal as an image.

(Hardware Configuration of Information Processing Apparatus)

Figure 4:
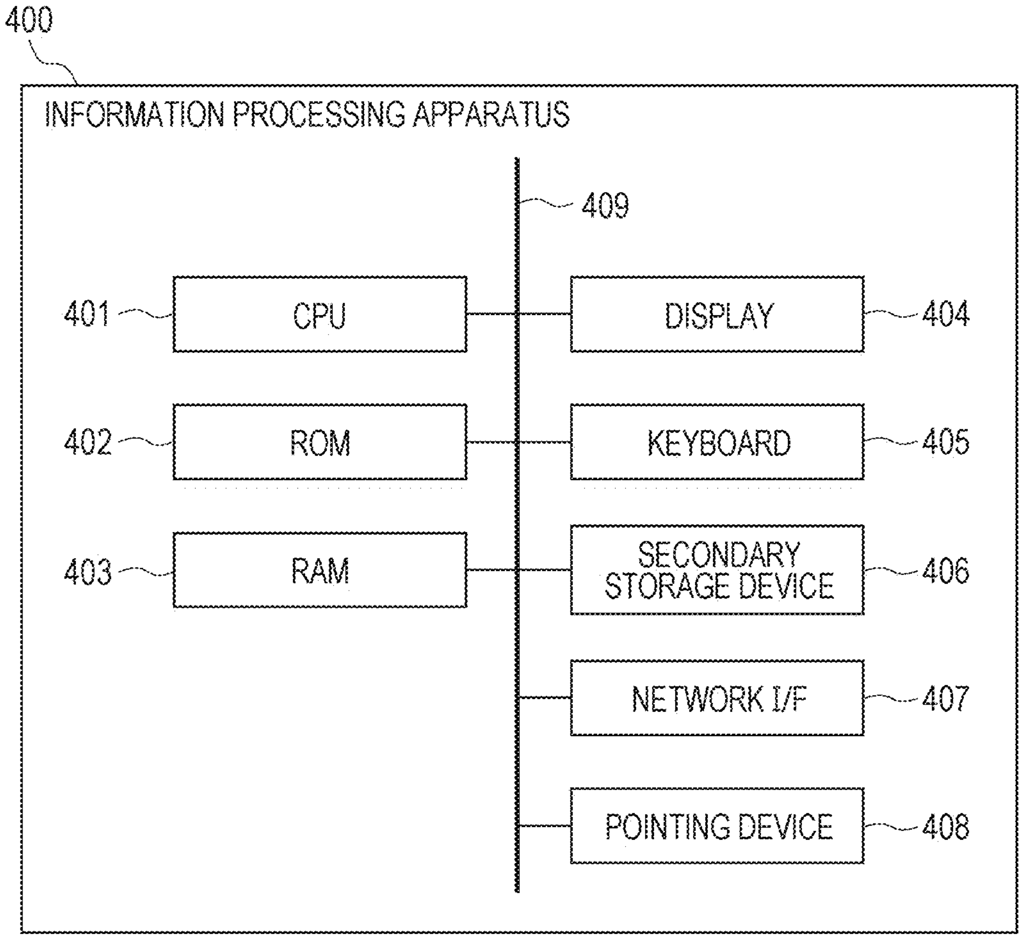
FIG. 4 is a diagram illustrating an example of a hardware configuration of an information processing apparatus.

With reference to FIG. 4, an example of the hardware configuration of an information processing apparatus 400 usable as the image management apparatus 102, the information management apparatus 103, and the terminal 104 will be described. The information processing apparatus 400 has a CPU 401, a ROM 402, a RAM 403, a display 404, a keyboard 405, a secondary storage device 406, a network I/F 407, and a pointing device 408. The series of constructional elements of the information processing apparatus 400 described above as examples are connected via a bus 409 such that information can be transmitted to and received from each other.

The CPU 401 is an arithmetic processing device that executes programs stored in the ROM 402 and the secondary storage device 406 to control the individual units connected via the bus 409. The ROM 402 is a read-only memory that stores the OS and so forth. The RAM 403 is a memory that temporarily stores data when the CPU 401 performs arithmetic processing.

The display 404 is a display device that presents various types of information, such as various UI screens, to the user by displaying the information in a predetermined display region. The keyboard 405 and pointing device 408 are input devices for accepting various operations related to various instructions from the user.

The secondary storage device 406 is a storage area used to store various programs, setting value data, databases (DBs), and so forth. Moreover, for example, the data of captured images may be stored in the secondary storage device 406.

The network I/F 407 is a network interface for connecting the information processing apparatus 400 to networks, such as a LAN, an intranet, and the Internet. Note that the configuration of the network I/F 407 may be changed as necessary in accordance with the type of network to be connected and a communication method to be used.

(Logical Configuration of Image Management System)

Figure 5:
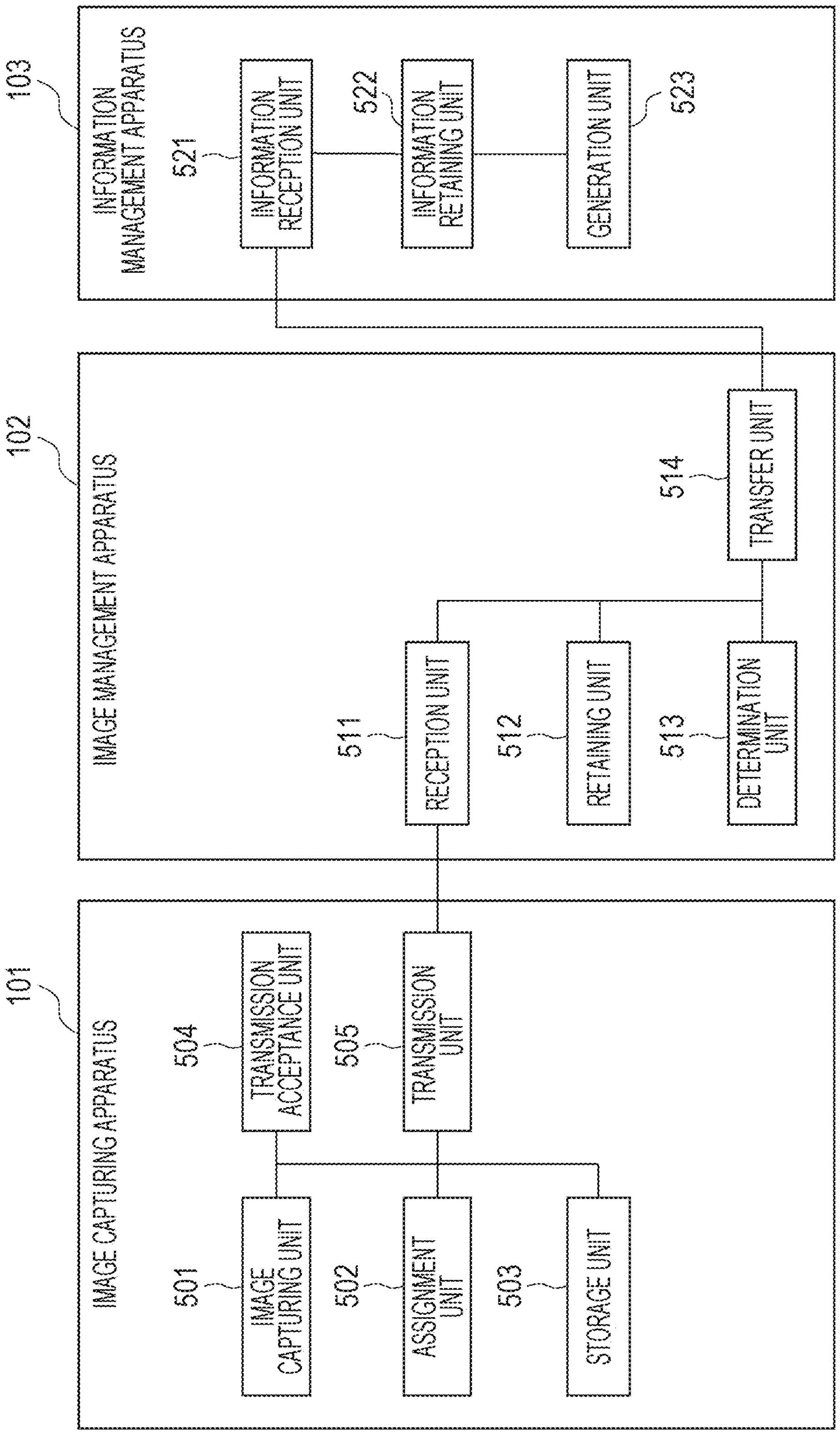
FIG. 5 is a diagram illustrating an example of a logical configuration of the image management system.

With reference to FIG. 5, an example of the logical configuration of the image management system 100 and the information management apparatus 103 according to the present embodiment will be described. Note that detailed description of the terminal 104 is omitted because a general PC, smartphone, and tablet terminal can be used.

Logical Configuration of Image Capturing Apparatus 101

The logical configuration of the image capturing apparatus 101 for realizing various functions is realized, for example, by the CPU 301 loading the program(s) stored in the ROM 302 into the RAM 303 and performing processes according to the sequence diagram and flowcharts to be described below. The results of performing each process are retained in a storage area such as the RAM 303 or the like.

The image capturing apparatus 101 includes an image capturing unit 501, an assignment unit 502, a storage unit 503, a transmission acceptance unit 504, and a transmission unit 505.

The image capturing unit 501 reads out the sensor values of the image sensor on the basis of image capturing instructions from the user 105 (for example, a photographer) and generates images based on those sensor values.

The assignment unit 502 assigns, as accompanying information, various types of information regarding an image generated by the image capturing unit 501 to the image. The accompanying information may include, for example, information indicating the image type of a target image. The image type corresponds to information indicating a classification indicating the nature of the image, such as an original image or a proxy image, or the purpose of use of the image.

An original image corresponds to an image from which a proxy image is generated, which will be described in detail below, and corresponds to an image whose image type is at least different from that of the proxy image in the present embodiment. For example, the original image may correspond to an image generated as a temporary creation. As a specific example, an image (a so-called "captured image") generated in accordance with the result of image capturing based on the setting information (hereinafter also referred to as "image capturing settings") regarding image capturing set for the image capturing apparatus 101 may correspond to an original image. As another example, an artificially generated image, such as a computer graphics (CG) image or an illustration image, which is generated by an image generation tool or the like, may correspond to an original image in a case where the artificially generated image can be used to generate a proxy image. The original image can be used as a target to be subjected to editing processing due to its low degradation.

A proxy image is an image generated by performing control such that the amount of data of the original image is reduced by, for example, reducing the resolution of the original image. As a specific example, a proxy image may be generated by performing control such that the resolution of the original image is further reduced. As another example, a proxy image may be generated by performing compression processing, such as encoding or the like. A proxy image has a smaller amount of data than at least the original image and is thus can be used as a target (for example, a preview image) when editing operations are performed.

The storage unit 503 is a storage area for storing various data. As a specific example, the data of an image corresponding to a result of image capturing by the image capturing unit 501 is retained by being stored in the storage unit 503.

The transmission acceptance unit 504 is an input interface that accepts, from the user 105, instructions regarding transmission of image data.

The transmission unit 505 performs processing regarding transmission of data to external devices and services. As a specific example, the transmission unit 505 transmits target image data to the image management apparatus 102 in accordance with a transmission instruction accepted by the transmission acceptance unit 504.

Logical Configuration of Image Management Apparatus 102

The logical configuration of the image management apparatus 102 for realizing various functions is realized, for example, by the CPU 401 loading the program(s) stored in the ROM 402 into the RAM 403 and performing processes according to the sequence diagram and flowcharts to be described below. The results of performing each process are retained in a storage area such as the RAM 403 or the like.

The image management apparatus 102 includes a reception unit 511, a retaining unit 512, a determination unit 513, and a transfer unit 514.

The reception unit 511 receives image data transmitted from the image capturing apparatus 101. Note that the image represented by the image data transmitted from the image capturing apparatus 101 corresponds to an example of a "target image". The image capturing apparatus 101 corresponding to the transmission source of the image data of the target image corresponds to an example of a "terminal device", which is an external apparatus different from the image management apparatus 102.

The retaining unit 512 retains various data including the image data received by the reception unit 511.

The determination unit 513 determines the image type of the image represented by the received image data.

The transfer unit 514 transfers the image data, which is a determination target, to a predetermined transfer destination (for example, the information management apparatus 103 described below) on the basis of the determination result from the determination unit 513.

Logical Configuration of Information Management Apparatus 103

The logical configuration of the information management apparatus 103 for realizing various functions is realized, for example, by the CPU 401 loading the program(s) stored in the ROM 402 into the RAM 403 and performing processes according to the sequence diagram and flowcharts to be described below. The results of performing each process are retained in a storage area such as the RAM 403 or the like.

The information management apparatus 103 includes an information reception unit 521, an information retaining unit 522, and a generation unit 523.

The information reception unit 521 receives image data transferred from the image management apparatus 102.

The information retaining unit 522 retains various data including the image data received by the information reception unit 521.

The generation unit 523 generates a proxy image about the image represented by the image data received by the information reception unit 521. As a specific example, in a case where the information reception unit 521 receives the data of a moving image, the generation unit 523 may generate a proxy video based on the moving image.

Note that the configuration illustrated in FIG. 5 is merely an example and does not limit the logical configuration of the image management system 100 and the information management apparatus 103 according to the present embodiment. As a specific example, the individual constructional elements of at least one of the image capturing apparatus 101, the image management apparatus 102, and the information management apparatus 103 may be distributed among and realized in a plurality of devices (for example, the image capturing apparatus, the information processing apparatus, and other apparatuses). Note that in a case where the series of constructional elements are distributed among a plurality of devices, each of the series of constructional elements is connected via a network, such as a LAN, such that communication is possible to and from each other and cooperate in executing a series of processes described separately below.

(Processing Performed by Image Processing System)

Figure 6:
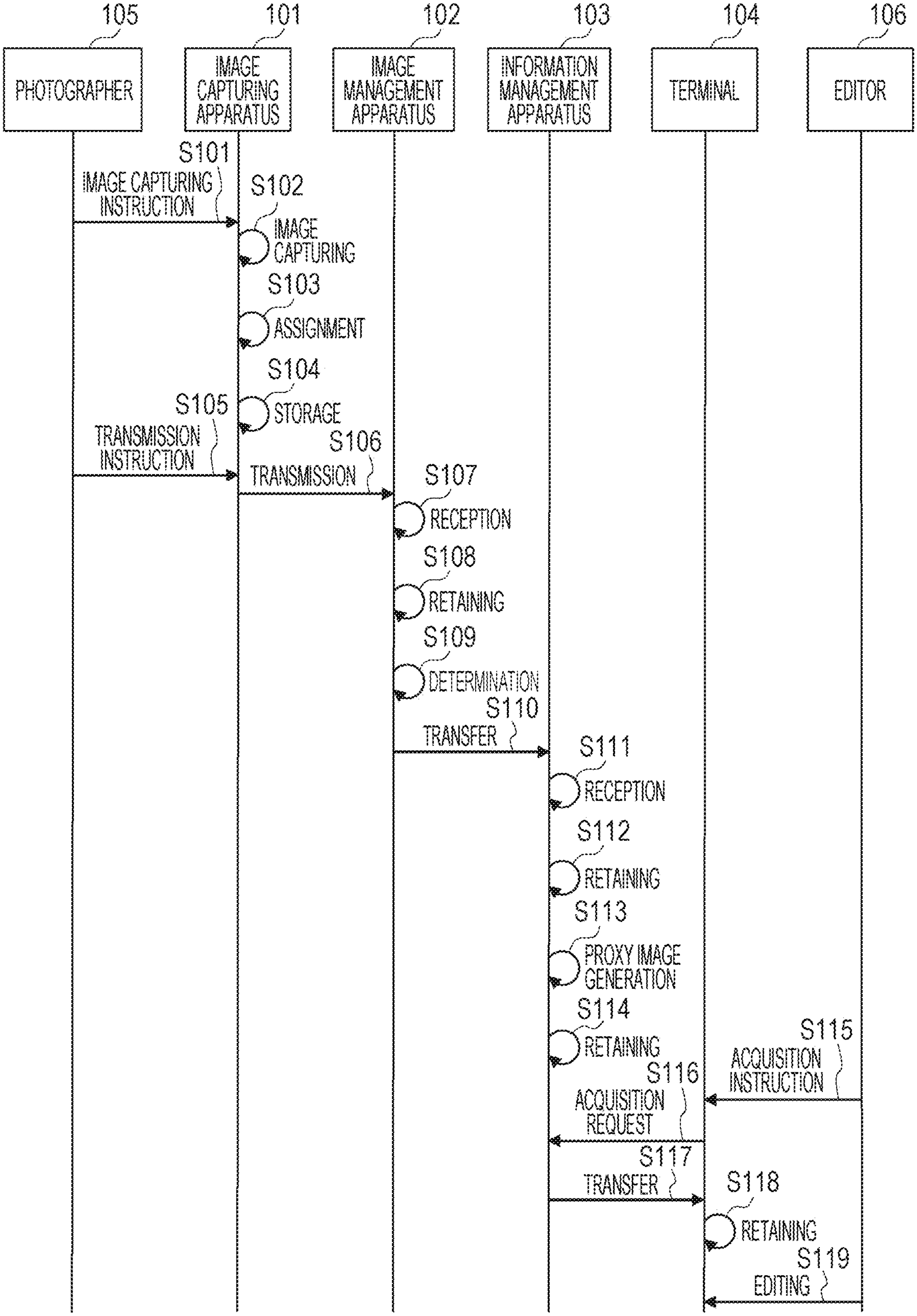
FIG. 6 is a sequence diagram illustrating an example of processing performed by the image management system.

With reference to FIG. 6, an example of processing performed by the image management system 100 according to the present embodiment will be described with a focus on parts related to image production (for example, video production).

In S101, the image capturing apparatus 101 accepts an image capturing instruction from the user 105 who is a photographer. The image capturing instruction is input to the image capturing apparatus 101, for example, by pressing down the shutter button of the image capturing apparatus 101. Note that image capturing instructions are not limited to instructions via the shutter button and may be input in various ways. As specific examples, methods using information regarding passage of a designated time using a timer function, a touch operation performed on a touch panel, a voice input via a microphone, and an input from a controller or smartphone connected to the image capturing apparatus 101 in a wired or wireless manner may be used as input methods for image capturing instructions.

In S102, on the basis of the image capturing instruction accepted in S101, the image capturing apparatus 101 captures a subject to generate an image corresponding to the image capturing result. Note that the details of processing performed by the image capturing unit 501 will be described separately with reference to FIGS. 8A and 8B.

In S103, the image capturing apparatus 101 assigns, to the image generated in S102, information indicating the image type corresponding to the image. The details of processing performed by the assignment unit 502 will be described separately with reference to FIGS. 9A and 9B.

In S104, the image capturing apparatus 101 stores the data of the generated image in the storage unit 503.

In S105, the image capturing apparatus 101 accepts an image transmission instruction from the user 105 who is a photographer.

In S106, the image capturing apparatus 101 transmits, in accordance with the transmission instruction accepted in S105, the data of the image that is the target to the image management apparatus 102.

In S107, the image management apparatus 102 receives the image data transmitted in S106 from the image capturing apparatus 101.

In S108, the image management apparatus 102 retains, in the retaining unit 512, the image data received in S107.

In S109, the image management apparatus 102 determines the image type of the image represented by the image data received in S107. The details of processing performed by the determination unit 513 will be described separately with reference to FIGS. 10A and 10B.

In S110, the image management apparatus 102 transfers, on the basis of the determination result in S109, the data of the image that is the target to the information management apparatus 103. The details of processing performed by the transfer unit 514 will be described separately with reference to FIG. 11.

In S111, the information management apparatus 103 receives the image data transferred in S110 from the image management apparatus 102.

In S112, the information management apparatus 103 retains, in the information retaining unit 522, the image data received in S111.

In S113, the information management apparatus 103 generates a proxy image of the image represented by the image data received in S111.

In S114, the information management apparatus 103 retains, in the information retaining unit 522, the data of the proxy image generated in S113.

In S115, the terminal 104 accepts a proxy image acquisition instruction from the user 106 who is an editor.

In S116, the terminal 104 transmits, on the basis of the acquisition instruction accepted in S115, a proxy image acquisition request from the user 106 (in other words, the request corresponds to a proxy image transmission request and is hereinafter also referred to as an acquisition request) to the information management apparatus 103.

In S117, the information management apparatus 103 transfers, in accordance with the acquisition request received in S116 from the terminal 104, the data of the corresponding proxy image to the terminal 104.

In S118, the terminal 104 retains, in a storage device inside the terminal, the data of the proxy image received in S117 from the information management apparatus 103.

In S119, the terminal 104 performs image processing on the target image (for example, the proxy image corresponding to the data retained in S118) in accordance with an editing instruction from the user 106.

(Processing Performed by Image Capturing Apparatus)

Figure 7A:
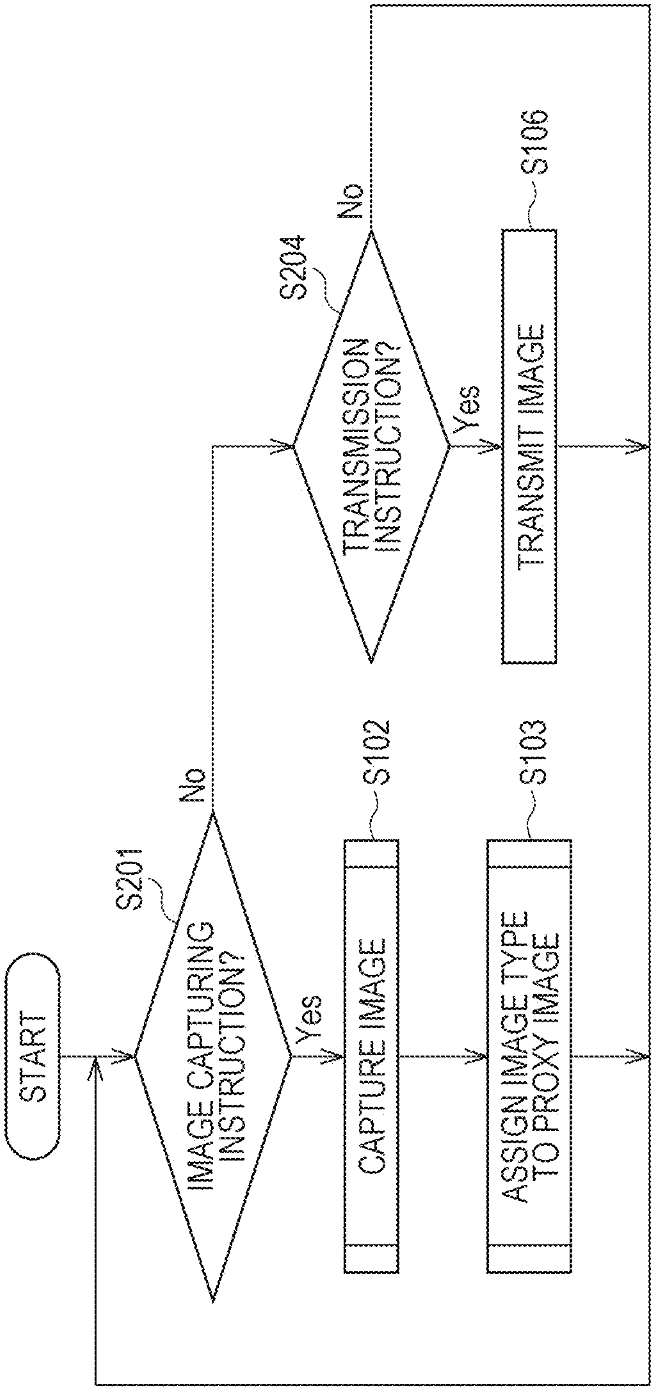
FIG. 7A is a flowchart illustrating an example of processing performed by the image capturing apparatus.

With reference to FIG. 7A, an example of processing performed by the image capturing apparatus 101 will be described. Note that the series of processes illustrated in FIG. 7A, for example, starts with the startup of the image capturing apparatus 101 and ends when the power is turned off.

In S201, the CPU 301 determines whether or not an image capturing instruction from the user 105 who is a photographer has been accepted.

In a case where the CPU 301 determines in S201 that an image capturing instruction has been accepted, the process proceeds to S102. In this case, processing in S102 and S103 is performed. Note that the processing in S102 and S103 illustrated in FIG. 7A corresponds to the processing in S102 and S103 illustrated in FIG. 6.

In contrast, in a case where the CPU 301 determines in S201 that an image capturing instruction has not been accepted, the process proceeds to S204.

In S204, the CPU 301 determines whether or not a transmission instruction from the user 105 has been accepted.

In a case where the CPU 301 determines in S204 that a transmission instruction has been accepted, the process proceeds to S106. In this case, processing in S106 is performed. Note that the processing in S106 illustrated in FIG. 7A corresponds to the processing in S106 illustrated in FIG. 6.

In contrast, in a case where the CPU 301 determines in S204 that a transmission instruction has not been accepted, the process proceeds to S201. In this case, the processing in and after S201 is performed again.

(Processing Performed by Image Capturing Unit)

Figure 8A:
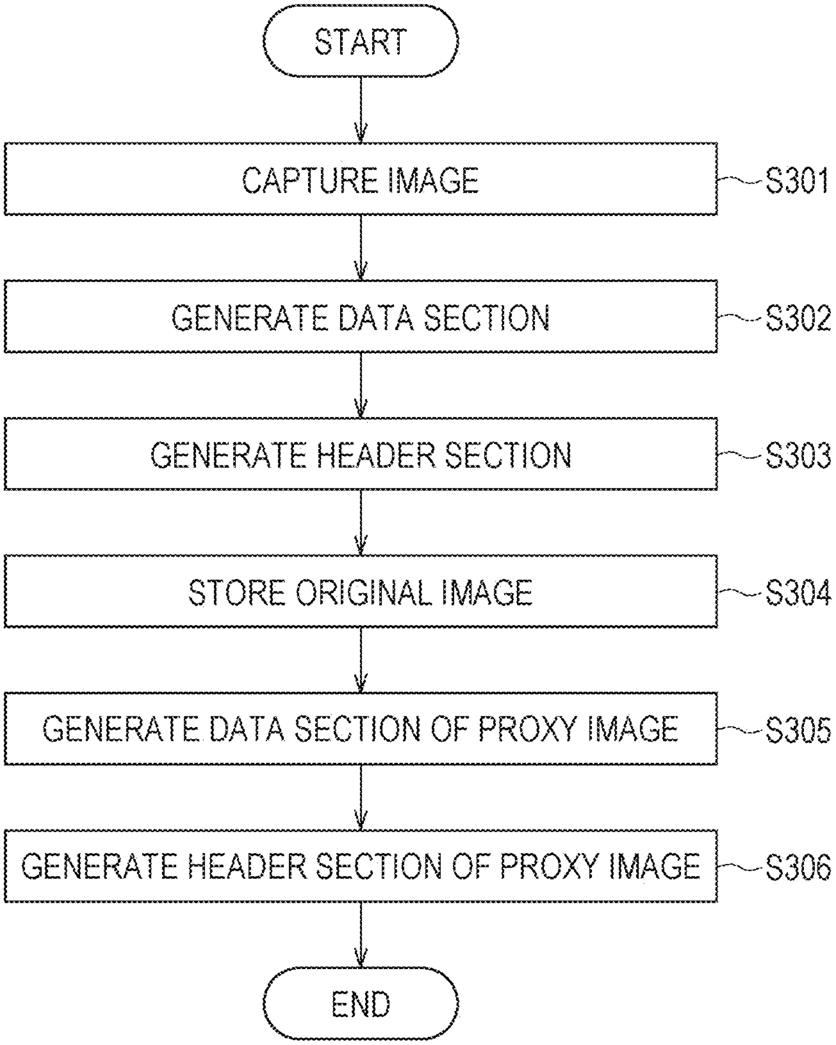
FIGS. 8A and 8B are flowcharts illustrating examples of processing performed by an image capturing unit.

With reference to FIG. 8A, an example of processing performed by the image capturing unit 501 will be described.

In S301, the image capturing unit 501 captures an image of a subject.

In S302, the image capturing unit 501 generates a data section of the image corresponding to the image capturing result in S301. The data section is a region corresponding to actual data of the image (for example, data corresponding to light reception results per pixel).

In S303, the image capturing unit 501 generates a header section corresponding to the image corresponding to the image capturing result in S301. The header section is a region where various types of attribute information regarding the image that is a target are stored.

In S304, the image capturing unit 501 generates the image data of an original image by concatenating the data section generated in S302 and the header section generated in S303. The image capturing unit 501 stores the generated image data of the original image in the storage unit 503.

In S305, the image capturing unit 501 generates the data section of a proxy image from the image corresponding to the image capturing result. The proxy image is generated by, for example, encoding the original image with high compression. In this case, the bit rate is reduced by encoding the original image so that the resolution of the proxy image becomes lower than that of the original image. Furthermore, in a case where the result of editing performed on the proxy image is applied to the original image, the frames are not thinned out in order to ensure the correspondence between the frames of the proxy image and those of the original image, and the proxy image can be encoded at the same frame rate as the original image.

In S306, the image capturing unit 501 generates the header section of the proxy image corresponding to the image corresponding to the image capturing result, and the series of processes illustrated in FIG. 8A ends.

(Processing Performed by Assignment Unit)

Figure 9A:
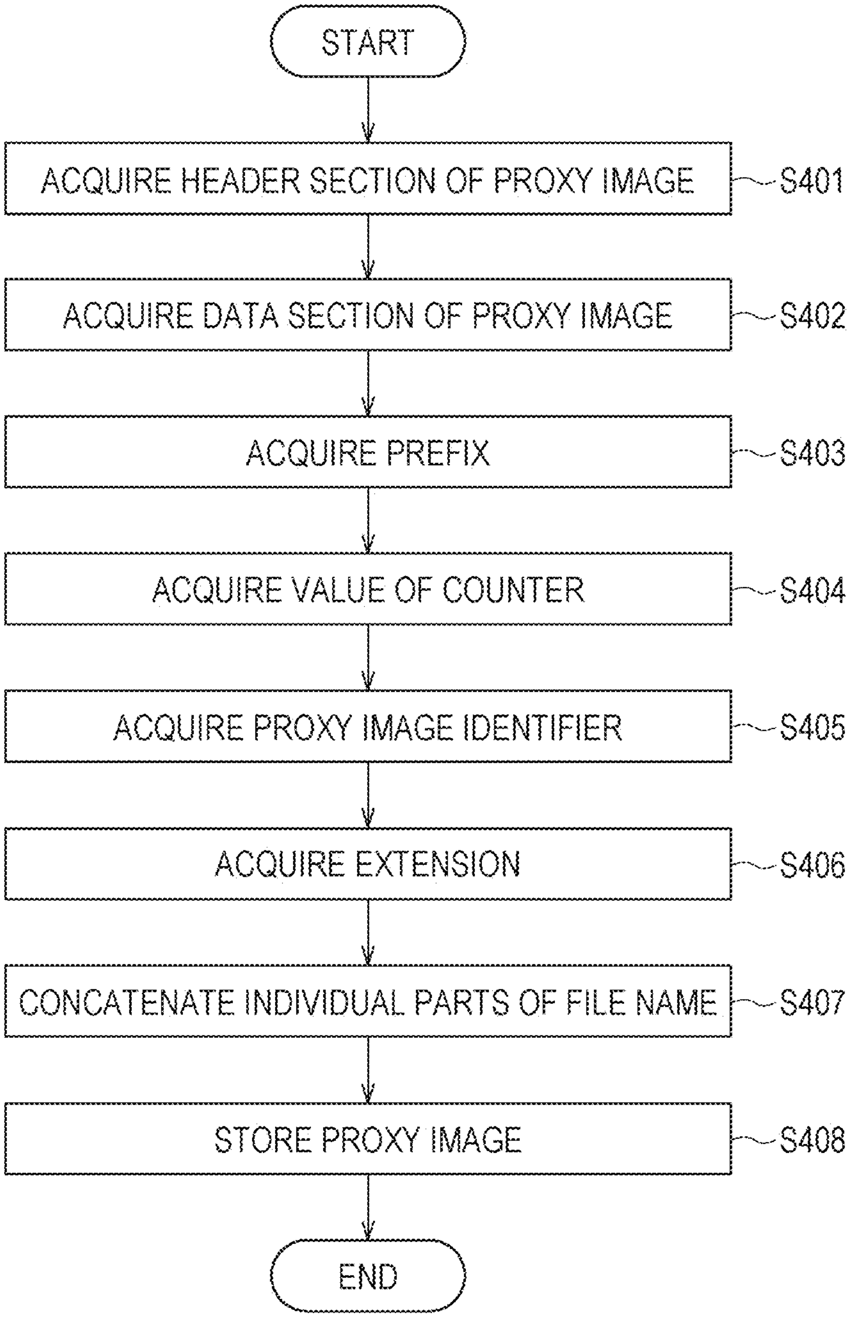
FIGS. 9A and 9B are flowcharts illustrating examples of processing performed by an assignment unit.

With reference to FIG. 9A, an example of processing performed by the assignment unit 502 will be described.

In S401, the assignment unit 502 acquires the header section of a proxy image from the RAM 303.

In S402, the assignment unit 502 acquires the data section of the proxy image from the RAM 303.

In S403, the assignment unit 502 acquires, from the RAM 303, an image identification name to be assigned to the image, such as the prefix of the file name. As the prefix, for example, a predetermined character string set for the image capturing apparatus 101 in advance by the user 105 who is a photographer is used. As a specific example, a character string such as "MVI_" and so forth is used.

In S404, the assignment unit 502 acquires, from the RAM 303, the value of a counter for counting the number of captured images. The counter counts the total number of images captured from the factory shipment time or since the counter was reset. For example, a predetermined sequence of numbers such as "0000" and so forth is used as the counter value.

In S405, the assignment unit 502 acquires a proxy image identifier from the RAM 303. The proxy image identifier is an identifier used to indicate whether or not a target image is a proxy image. As a specific example, a predetermined character string such as "_P" and so forth is used.

In S406, the assignment unit 502 acquires an extension to be concatenated to the end of the file name of the proxy image. The extension is determined in accordance with the settings for the image type generated at the time of image capturing, which were set in advance by the user 105. For example, in a case where the set image type is MPEG-4 Part 14 or MPEG-4 Part 14, "MP4" will be acquired as the extension.

In S407, the assignment unit 502 concatenates the character strings corresponding to each part of a file name to generate the file name. Specifically, a character string to be used as a file name is generated by concatenating the prefix of the file name, the counter value, the proxy image identifier, the delimiter, the extension, and so forth. For example, a period or the like is used as the delimiter.

In S408, the assignment unit 502 concatenates the header section of the proxy image and the data section of the proxy image and stores, in the storage unit 503, the data of the proxy image using the generated file name, and the series of processes illustrated in FIG. 9A ends.

(Processing Performed by Image Management Apparatus)

Figure 7B:
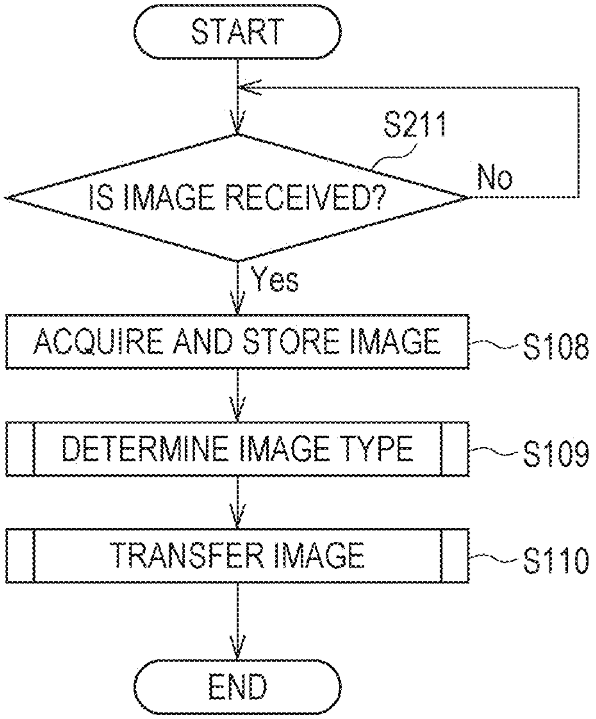
FIG. 7B is an example of processing performed by an image management apparatus.

With reference to FIG. 7B, an example of processing performed by the image management apparatus 102 will be described.

In S211, the CPU 401 determines whether or not the data of an image has been received from the image capturing apparatus 101.

The CPU 401 waits to receive the data of an image as long as the CPU 401 determines in S211 that the data of an image has not been received from the image capturing apparatus 101.

In a case where the CPU 401 determines in S211 that the data of an image has been received from the image capturing apparatus 101, the process proceeds to S108. In this case, processing in S108, S109, and S110 is performed. Note that the processing in S108, S109, and S110 illustrated in FIG. 7B corresponds to the processing in S108, S109, and S110 illustrated in FIG. 6.

(Processing Performed by Determination Unit)

Figure 10A:
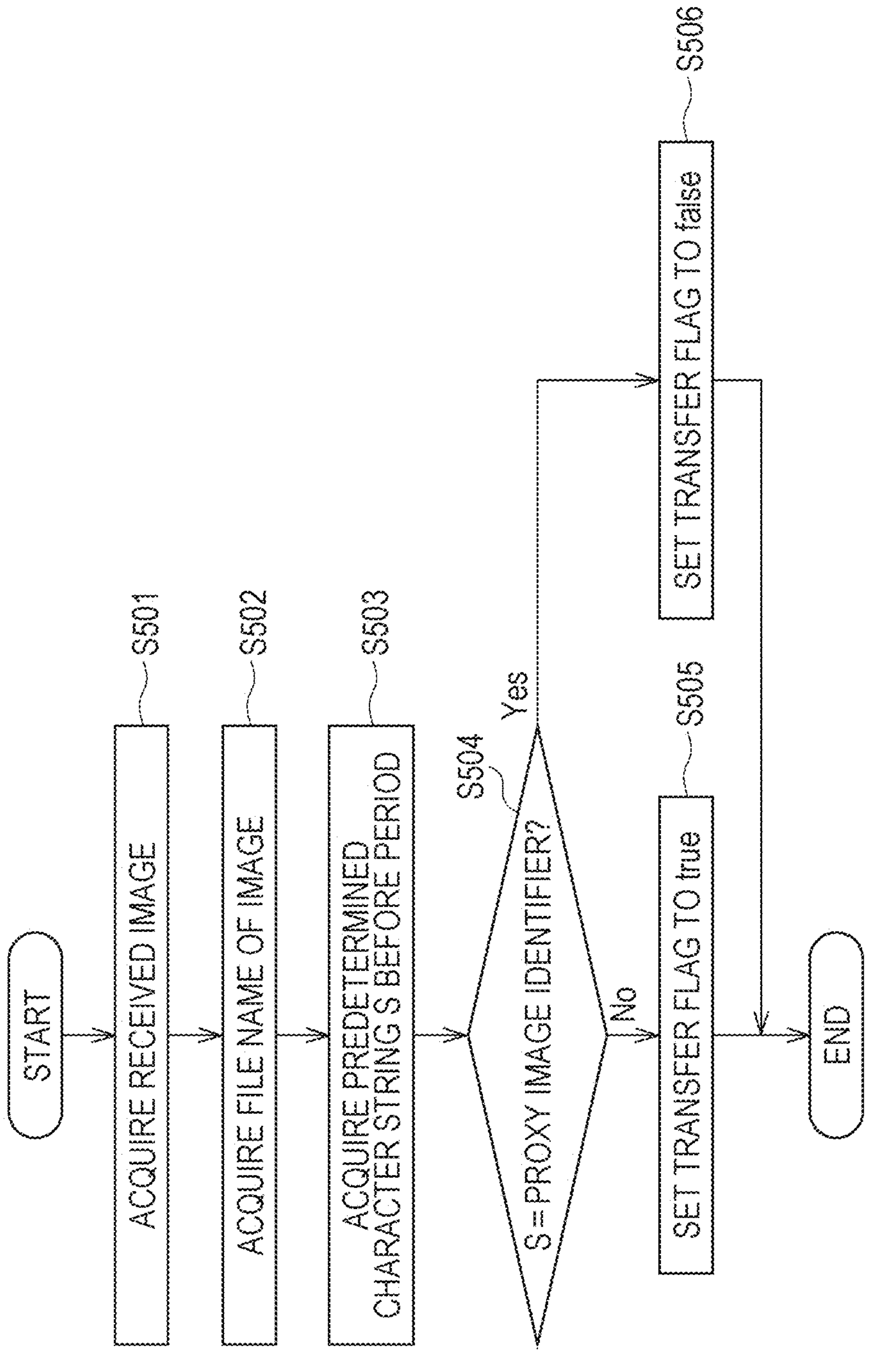
FIGS. 10A and 10B are flowcharts illustrating examples of processing performed by a determination unit.

With reference to FIG. 10A, an example of processing performed by the determination unit 513 will be described.

In S501, the determination unit 513 acquires the data of a received image from the retaining unit 512.

In S502, the determination unit 513 acquires the file name of the image data acquired in S501.

In S503, the determination unit 513 acquires a character string S of a predetermined number of characters from the period (a delimiter character corresponding to the extension specification) closest to the end of the file name, in a direction toward the beginning of the file name. For example, in a case where the file name is "MVI_0000_P.MP4" and the predetermined number of characters is two, the character string S is "_P".

In S504, the determination unit 513 determines whether or not the character string S matches the proxy image identifier.

In a case where the determination unit 513 determines in S504 that the character string S does not match the proxy image identifier, the process proceeds to S505. In this case, in S505, the determination unit 513 sets a transfer flag to true, and the series of processes illustrated in FIG. 10A ends.

In contrast, in a case where the determination unit 513 determines in S504 that the character string S matches the proxy image identifier, the process proceeds to S506. In this case, in S506, the determination unit 513 sets the transfer flag to false, and the series of processes illustrated in FIG. 10A ends.

(Processing Performed by Transfer Unit)

Figure 11:
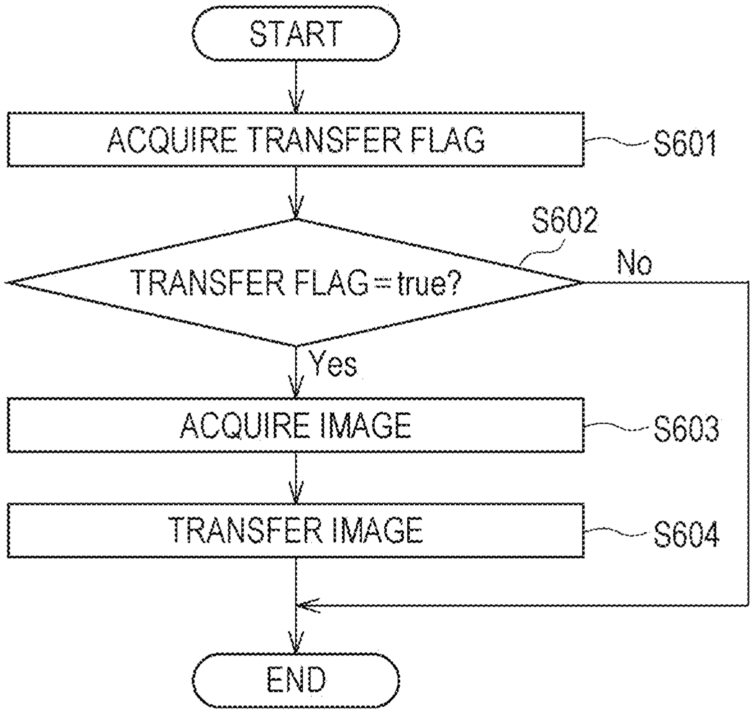
FIG. 11 is a flowchart illustrating an example of processing performed by a transfer unit.

With reference to FIG. 11, an example of processing performed by the transfer unit 514 will be described.

In S601, the transfer unit 514 acquires, from the RAM 403, the transfer flag set for a target image.

In S602, the transfer unit 514 determines whether or not the transfer flag acquired in S601 is true.

In a case where the transfer unit 514 determines in S602 that the transfer flag is true, the process proceeds to S603.

In contrast, in a case where the transfer unit 514 determines in S602 that the transfer flag is not true, namely false, the series of processes illustrated in FIG. 11 ends.

In S603, the transfer unit 514 acquires the image data of the target image from the RAM 403.

In S604, the transfer unit 514 transfers the image data acquired in S603 to the information management apparatus 103, and the series of processes illustrated in FIG. 11 ends.

Note that, in the present embodiment, the example is described in which the information indicating the image type is assigned as a suffix before the delimiter of the identification name of the image; however, the method for specifying information indicating an image type is not limited to this example, and the information may be assigned as a prefix, for example. As a specific example, in a case where an identification name is "MVI_0001.MP4" and a prefix is "P_", the identification name of a proxy image would be "P_MVI_0001.MP4". Information indicating an image type may also be included in the middle of an identification name. For example, in the above-described example, the identification name of the proxy image would be "MVI_P_0001.MP4". That is, in a case where control is performed to include information indicating an image type as part of the identification name of a proxy image, the method for including such information is not limited to any particular method.

The use of such a configuration makes it possible to deal with a wide variety of image management methods. As a specific example, in a case where information indicating an image type is assigned as a prefix or included in the middle of an identification name, when images are aligned on the basis of the identification names of the images, it is possible to separate original images from proxy images and list and view the original images and the proxy images as respective groups. In a case where information indicating an image type is assigned as a suffix, it is possible to list and view original images and proxy images such that, for each image, an original image and a proxy image are paired.

In addition, in the present embodiment, the case has been described in which an identification name is generated when a proxy image is stored and the proxy image is stored using its identifier; however, this does not limit the method for assigning information indicating a proxy image. As a specific example, after the data of a proxy image is stored, information indicating an image type may be assigned to the proxy image.

In the present embodiment, the example is described in which information indicating an image type is assigned to the identification name of the image; however, the specification target for the information indicating the image type is not limited to this example, and the information indicating the image type of the image may be assigned to accompanying information accompanying the image, for example. As another example, the information indicating the image type may be written at a predetermined absolute address in the metadata of the image. As another example, an offset value to the address where the information indicating the image type is stored may be written into the value of a predetermined tag. As another example, a relative address to the address where the information indicating the image type is stored may be written into the value of a predetermined tag. As another example, the information indicating the image type may be written into the manufacturer's note area reserved as the manufacturer's note. The use of such a configuration makes it possible to flexibly design the storage location of information indicating an image type. The storage position of the metadata in the image data can be either the first region or the last region relative to the image data section where the substantive data of the image is stored.

In addition, the information indicating the image type may be embedded in the image data section itself. As a specific example, the information indicating the image type may be embedded in the most significant or least significant bit of the image data section. As another example, the information indicating the image type may be embedded in the watermark area or alpha channel area of the image data. The use of such a configuration makes it possible to determine the image type on the basis of the information embedded in the image data section even in a case where, for example, the metadata of the image is corrupted.

Note that, in the present embodiment, an example of the case has been described in which the image type is determined by a proxy image identifier; however, the method for specifying an identifier that indicates an image type is not limited to any particular method. As a specific example, the image type of a target image may be determined by an original image identifier, which indicates that the target image is an original image.

Figure 10B:
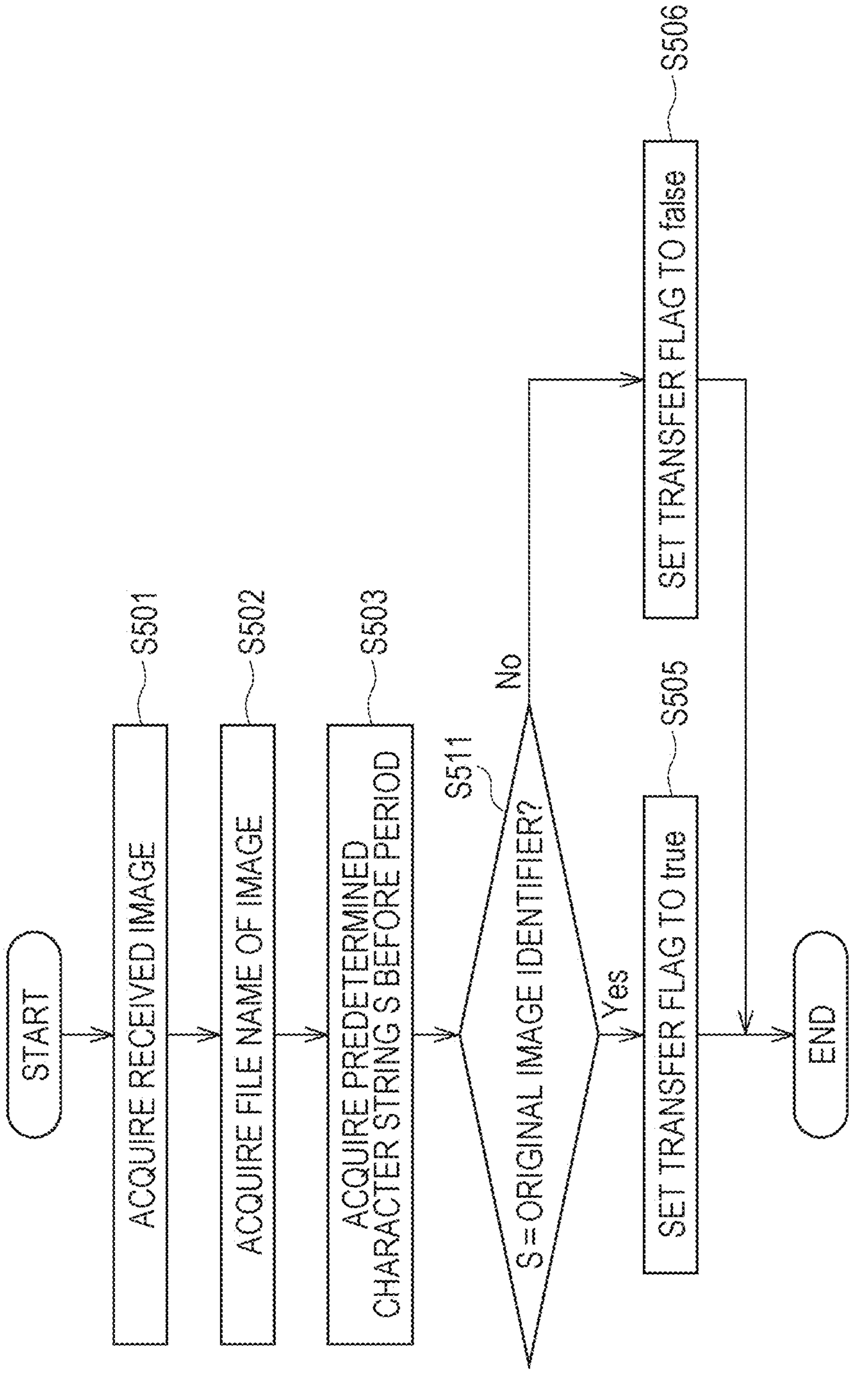

In that case, it is sufficient that the processing performed by the determination unit 513 be processing as illustrated in FIG. 10B. In the example illustrated in FIG. 10B, in S511, the determination unit 513 determines whether or not the character string S matches an original image identifier. In a case where the determination unit 513 determines in S511 that the character string S matches an original image identifier, the target image is determined to be an original image, and the process proceeds to S505. In contrast, in a case where the determination unit 513 determines in S511 that the character string S does not match an original image identifier, the target image is determined to not be an original image, and the process proceeds to S506. Note that, as original image identifiers, it is sufficient that character strings indicating original images such as "_O", "_origin", and so forth be used.

Figure 8B:
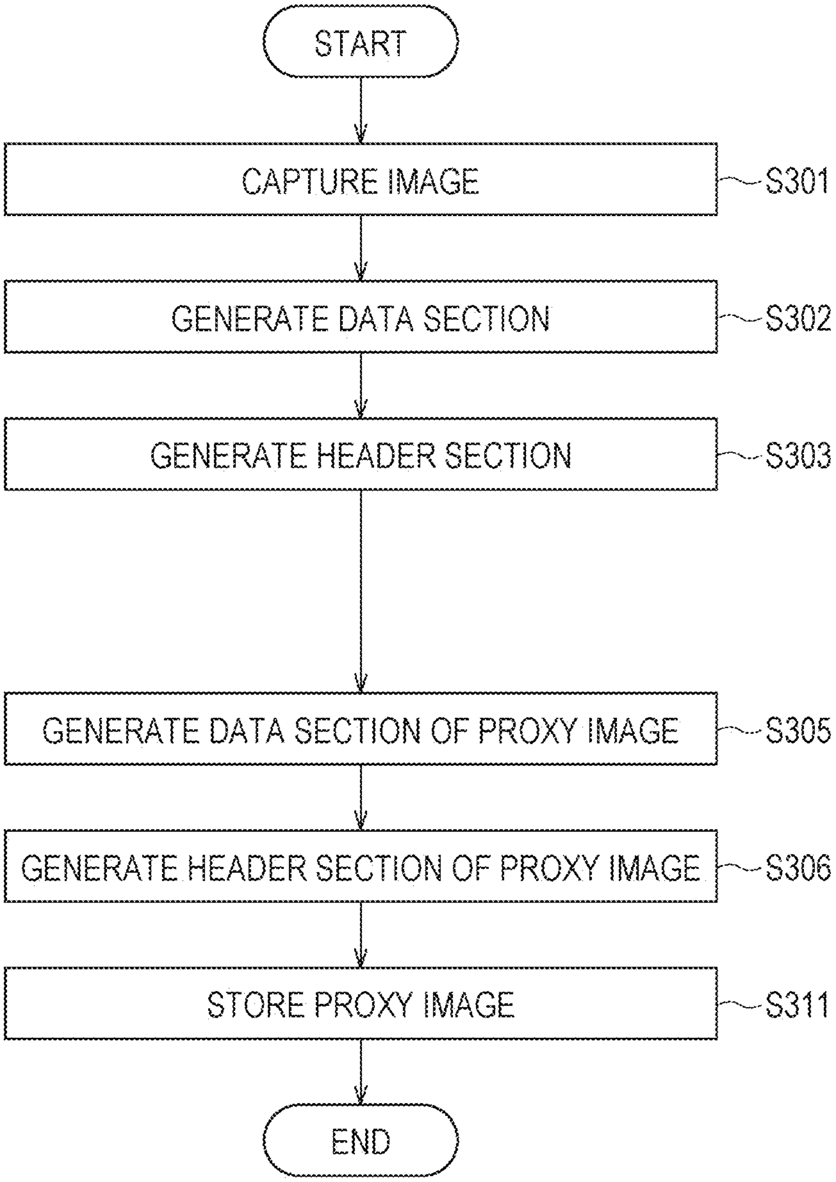

Moreover, since original image identifiers are assigned to original images, it is sufficient that the processing performed by the image capturing unit 501 be processing as illustrated in FIG. 8B. In the example illustrated in FIG. 8B, in S311, the image capturing unit 501 concatenates the header section of the proxy image and the data section of the proxy image and stores the data of the proxy image in the storage unit 503, and thereafter the series of processes illustrated in FIG. 8B ends.

Figure 9B:
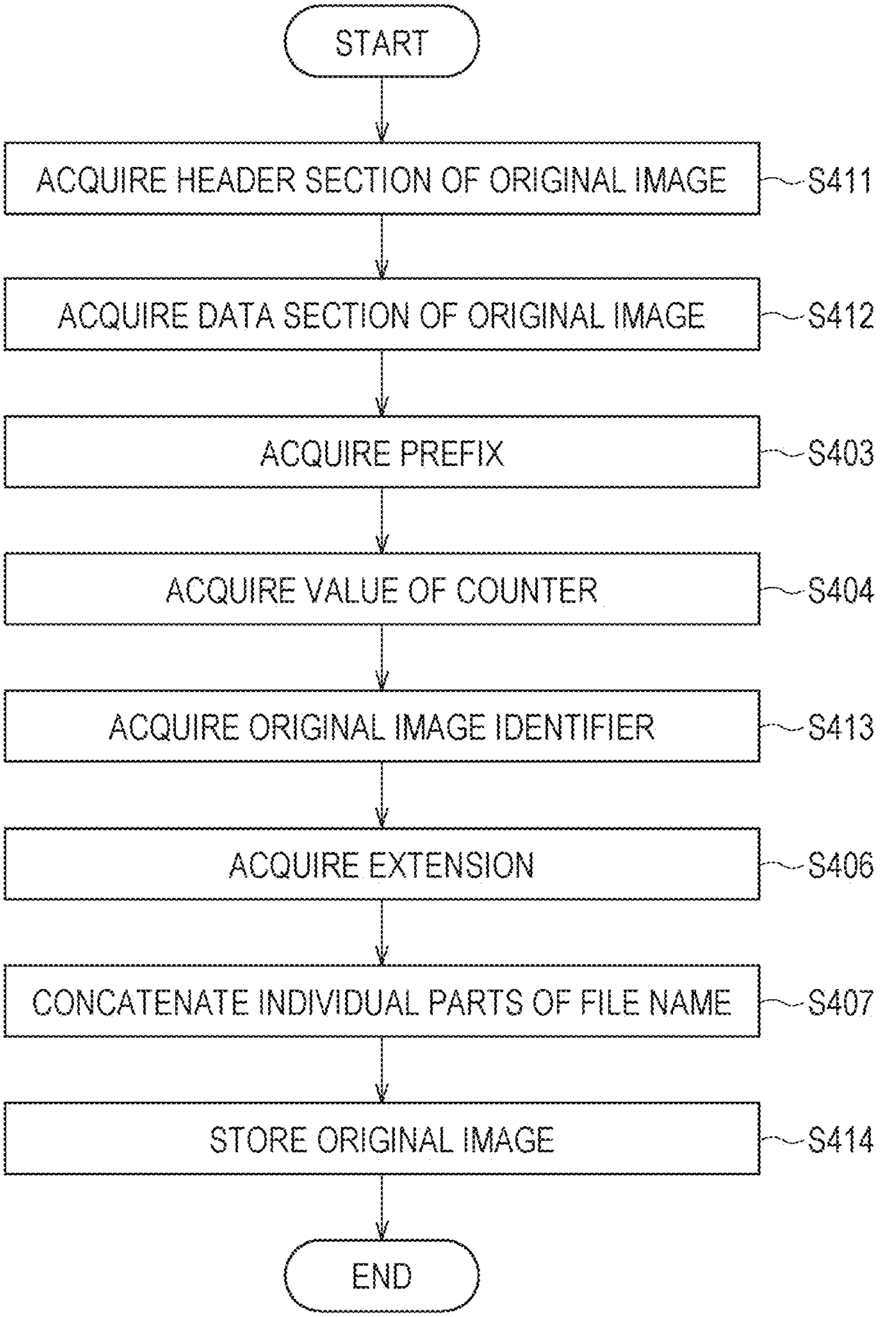

Moreover, it is sufficient that the processing performed by the assignment unit 502 be processing as illustrated in FIG. 9B.

Specifically, in S411, the assignment unit 502 acquires the header section of an original image from the RAM 303.

In S412, the assignment unit 502 acquires the data section of the original image from the RAM 303.

In S413, the assignment unit 502 acquires an original image identifier from the RAM 303. As original image identifiers, for example, predetermined character strings such as "_O" and so forth are used.

In S414, the assignment unit 502 stores the data of the original image in the storage unit 503 using a file name generated by concatenating the header section of the original image and the data section of the original image, and the series of processes illustrated in FIG. 9B ends.

In the present embodiment, an example of the case has been described in which the original image or proxy image is used as an image type; however, the present embodiment is not limited to this example, and classifications indicating the natures of images other than the images described above or the purposes of use of those images may also be used. As a specific example, a secondary image that is recorded in association with an original image may be used as the image type of a determination target. The secondary image may be generated as an image having a lower resolution than the original image, similarly to as in the case of a proxy image, but has the property of not having been reduced in resolution as much as the proxy image. Because of such properties, secondary images can be used for fine-tuning fine image regions.

In a case where a secondary image is included in image types, for example, it is sufficient that processing be performed in which the determination unit 513 determines whether or not a specified character string S is a proxy image identifier and also whether or not the image is a secondary image, and determines that the image is an original image in a case where the specified character string S is not a proxy image identifier and where the image is not a secondary image.

Even when an image capturing apparatus is capable of generating an original image, a proxy image, and a secondary image in accordance with the result of image capturing, such a configuration makes it possible to correctly determine whether or not the target image is an original image and transfer the data of an original image to a predetermined transfer destination.

Note that, in the present embodiment, an example of the case has been mainly described in which data to be a processing target is still or moving image data; however, such data is not limited to two-dimensional data, and multidimensional data, such as one-dimensional or three-dimensional data, may also be a processing target. As a specific example, in a case where three-dimensional data is a processing target, three-dimensional data constituted by many pieces of three-dimensional position information may correspond to an original image. This three-dimensional data is thinned out to have a lower data density, and the resulting three-dimensional data corresponds to a proxy image. For example, stereo cameras and light detection and ranging (LIDAR) devices are examples of acquisition devices that can acquire three-dimensional data. These devices correspond to the image capturing apparatus in the embodiment described above. Moreover, in this case, three-dimensional data editing software that can edit three-dimensional data corresponds to the image editing software (for example, video editing software) in the embodiment described above. The rendering of three-dimensional data may correspond to processing for applying editing results to an original image in the embodiment described above.

Many three-dimensional data acquired by a three-dimensional data acquisition device and three-dimensional data obtained by reducing the data density of the acquired three-dimensional data are transmitted to the image management apparatus 102. Note that the three-dimensional data having a lower data density is transmitted after information indicating an image type is assigned thereto so that it is clear that the three-dimensional data has been subjected to processing for reducing data density. It is sufficient that the image management apparatus 102 that has received these three-dimensional data be configured to determine, on the basis of the information indicating the image type, the image type of the three-dimensional data that is a target, and control transfer of the three-dimensional data in accordance with the result of the determination. The use of such a configuration is expected to have the effect of preventing transfer of unnecessary proxy images even at sites where video production is performed using three-dimensional data.

As described above, in the image management system 100 according to the present embodiment, the image type of an image transmitted from an external apparatus such as the image capturing apparatus is determined, and in a case where the image type of the image is determined to be an original image, the image is controlled to be transferred to the information management apparatus.

The use of such a configuration makes it possible to prevent a case from occurring in which, for example, a proxy image is transferred to the information management apparatus and a proxy image is further created from that proxy image.

Figure 26A:
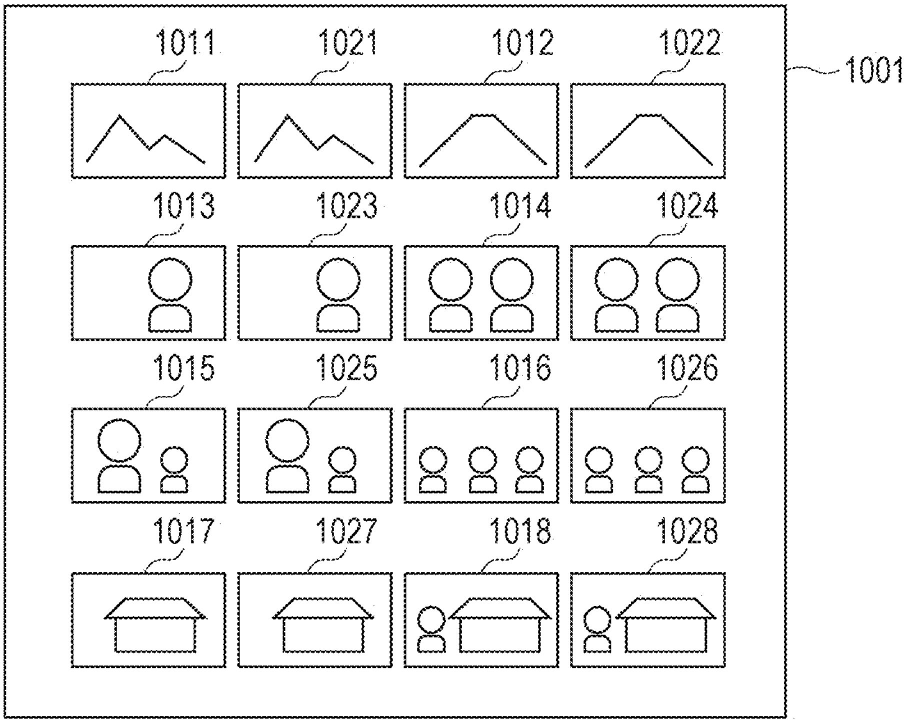
FIGS. 26A and 26B are diagrams illustrating examples of output results of an image list viewing screen.
Figure 26B:
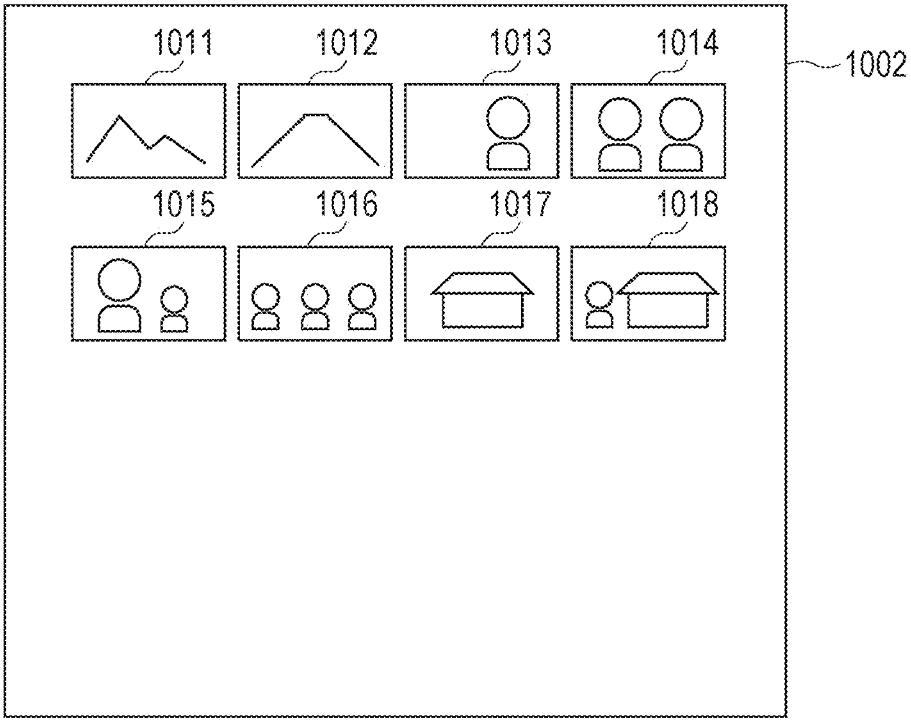

In the following, with reference to FIGS. 26A and 26B, the operational effects that can be achieved with the use of the technology according to the present embodiment will be described with specific examples. FIGS. 26A and 26B each illustrate an example of a screen for viewing a list of images managed by the information management apparatus 103 (hereinafter also referred to as an image list viewing screen).

A screen 1001 illustrates an example of an image list viewing screen for a case where the technology according to the present embodiment is not used. Images 1011 to 1018 are original images. In contrast, images 1021 to 1028 are proxy images generated from the images 1011 to 1018 that are original images. On the screen 1001 illustrated in FIG. 26A, the original images and the proxy images corresponding thereto have the same designs as each other, and thus the images are presented in a state where pairs of images that have the same designs as each other are lined up side by side. This may reduce the clarity of image listing. Moreover, under a situation where an original image is supposed to be selected, a situation can be assumed to occur where a proxy image is mistakenly selected.

In contrast, on a screen 1002 illustrated in FIG. 26B, the original images are individually displayed, so that the clarity of image listing is improved compared to that of the screen 1001. In addition, since only the original images are displayed, it is possible to prevent a case from occurring in which a proxy image is selected mistakenly.

Second Embodiment

In the following, a second embodiment of the present disclosure will be described. In the first embodiment described above, an example of the case has been described in which the image type of the received image is determined on the basis of the information assigned to the image, and the data of the image is transferred to a predetermined transfer destination in accordance with the result of the determination. In contrast, in the present embodiment, an example of a case will be described in which the image type of a target image is determined on the basis of information received when the target image is received.

(Logical Configuration of Image Management System)

Figure 12:
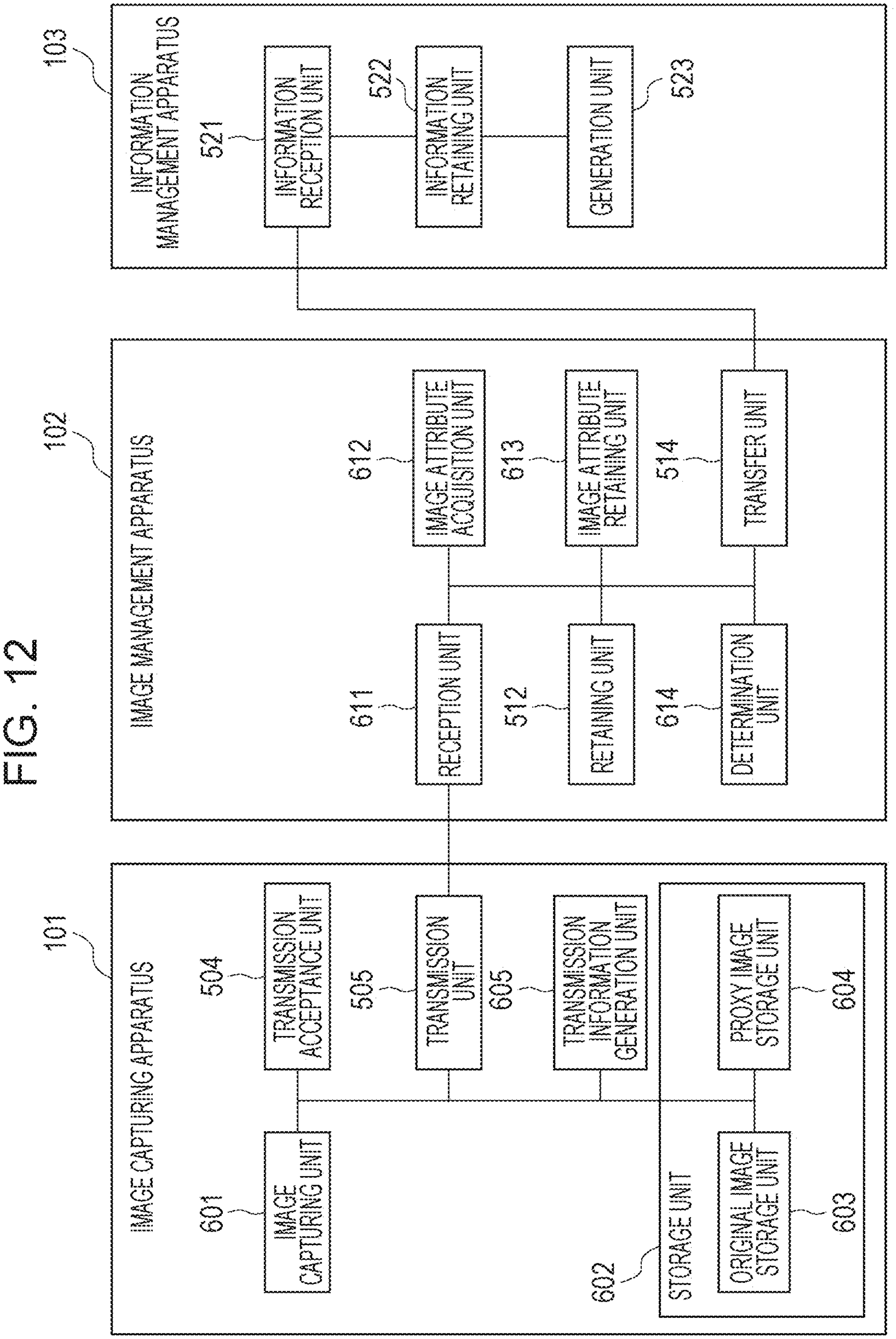
FIG. 12 is a diagram illustrating an example of the logical configuration of the image management system.

With reference to FIG. 12, an example of the logical configuration of the image management system 100 and the information management apparatus 103 according to the present embodiment will be described. Note that, in the example illustrated in FIG. 12, the same signs are assigned to constructional elements that are substantially the same as those in the first embodiment described with reference to FIG. 5, and detailed description of these constructional elements will be omitted.

Logical Configuration of Image Capturing Apparatus 101

The logical configuration of the image capturing apparatus 101 for realizing various functions is realized, for example, by the CPU 301 loading the program(s) stored in the ROM 302 into the RAM 303 and performing processes according to the sequence diagram and flowcharts to be described below. The results of performing each process are retained in a storage area such as the RAM 303 or the like.

The image capturing apparatus 101 includes an image capturing unit 601, a storage unit 602, the transmission acceptance unit 504, the transmission unit 505, and a transmission information generation unit 605. The storage unit 602 includes an original image storage unit 603 and a proxy image storage unit 604.

The image capturing unit 601 reads out the sensor values of the image sensor on the basis of image capturing instructions from the user 105 (for example, a photographer) and generates images based on those sensor values. In this case, in addition to generating an original image, the image capturing unit 601 may also generate a proxy image based on the original image. The image capturing unit 601 stores the data of the generated original image in the original image storage unit 603 and stores the data of the generated proxy image in the proxy image storage unit 604.

The storage unit 602 is a storage area for storing various data. As described above, the storage unit 602 may store the data of original images and the data of proxy images.

Part of the storage area of the storage unit 602 is assigned to the original image storage unit 603, and the original image storage unit 603 is used as a storage area for storing the data of original images.

Part of the storage area of the storage unit 602 is assigned to the proxy image storage unit 604, and the proxy image storage unit 604 is used as a storage area for storing the data of proxy images.

The transmission information generation unit 605 generates transmission information corresponding to a transmission parameter for when image data is transmitted.

Logical Configuration of Image Management Apparatus 102

The logical configuration of the image management apparatus 102 for realizing various functions is realized, for example, by the CPU 401 loading the program(s) stored in the ROM 402 into the RAM 403 and performing processes according to the sequence diagram and flowcharts to be described below. The results of performing each process are retained in a storage area such as the RAM 403 or the like.

The image management apparatus 102 includes a reception unit 611, the retaining unit 512, an image attribute acquisition unit 612, an image attribute retaining unit 613, a determination unit 614, and the transfer unit 514.

The reception unit 611 receives image data transmitted from the image capturing apparatus 101 and transmission information (for example, a transmission parameter) regarding the transmission of the image data.

The image attribute acquisition unit 612 acquires information indicating image attributes from the transmission information received by the reception unit 611, associates the received image data with the information indicating the image attributes, and stores the received image data and the information indicating the image attributes in the image attribute retaining unit 613. The information indicating the image attributes is attribute information indicating properties of the target image and may include information that is so-called metadata. As a specific example, the information indicating the image attributes may include information indicating data characteristics of the image, such as a horizontal resolution, a vertical resolution, a bit rate, and so forth.

The image attribute retaining unit 613 is a storage area that retains the image data and the information indicating the image attributes such that the image data and the information indicating the image attributes are associated with each other.

The determination unit 614 determines, on the basis of the information indicating the image attributes associated with the target image data, the image type of the image represented by the image data. In accordance with this image type determination result, the determination unit 614 determines whether or not to transfer the target image data to a predetermined transfer destination (for example, the information management apparatus 103).

Note that the individual constructional elements of the image management apparatus 102 may be realized by being distributed among a plurality of image management apparatuses. In a case where the functions of the image management apparatus 102 are distributed among a plurality of image management apparatuses, the plurality of image management apparatuses are connected via a LAN or the like so that communication is possible to and from each other and cooperate in the series of processes to be described below.

(Processing Performed by Image Capturing Apparatus)

Figure 13:
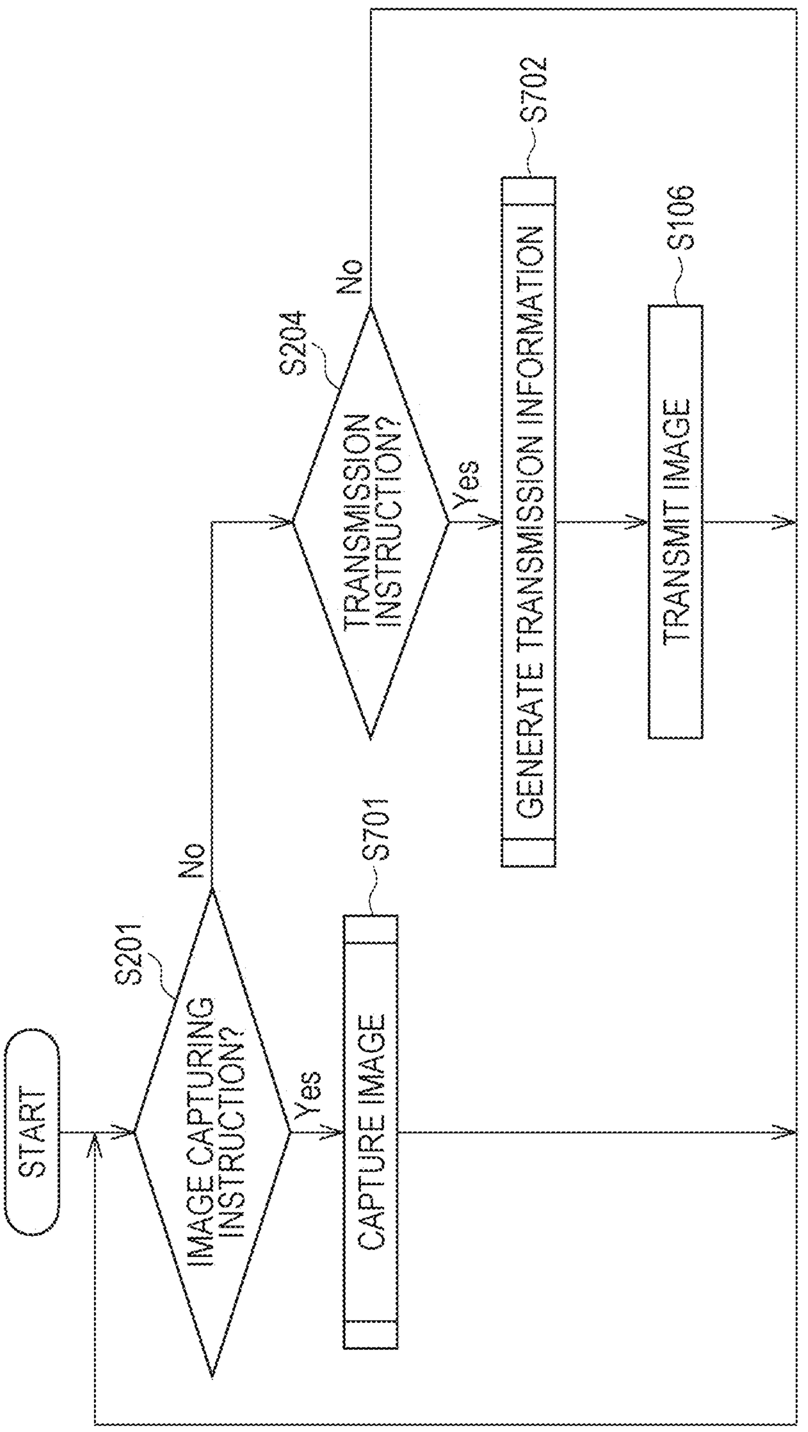
FIG. 13 is a flowchart illustrating an example of processing performed by the image capturing apparatus.

With reference to FIG. 13, an example of processing performed by the image capturing apparatus 101 will be described. Note that the series of processes illustrated in FIG. 13 starts with the startup of the image capturing apparatus 101 and ends when the power is turned off, for example. In the example illustrated in FIG. 13, the same signs are assigned to processes that are substantially the same as those in the first embodiment described with reference to FIG. 7A, and detailed description of these processes will be omitted.

In S701, the image capturing unit 601 captures a subject to generate an image corresponding to the image capturing result. In this case, the image capturing unit 601 generates, in addition to an original image, a proxy image based on the original image, and stores the data of the original image in the original image storage unit 603 and the data of the proxy image in the proxy image storage unit 604. Note that the processing performed by the image capturing unit 601 will be described in detail separately with reference to FIG. 14.

In S702, the transmission information generation unit 605 generates transmission information regarding transmission of target image data. The processing performed by the transmission information generation unit 605 will be described in detail separately with reference to FIGS. 15A and 15B.

(Processing Performed by Image Capturing Unit)

Figure 14:
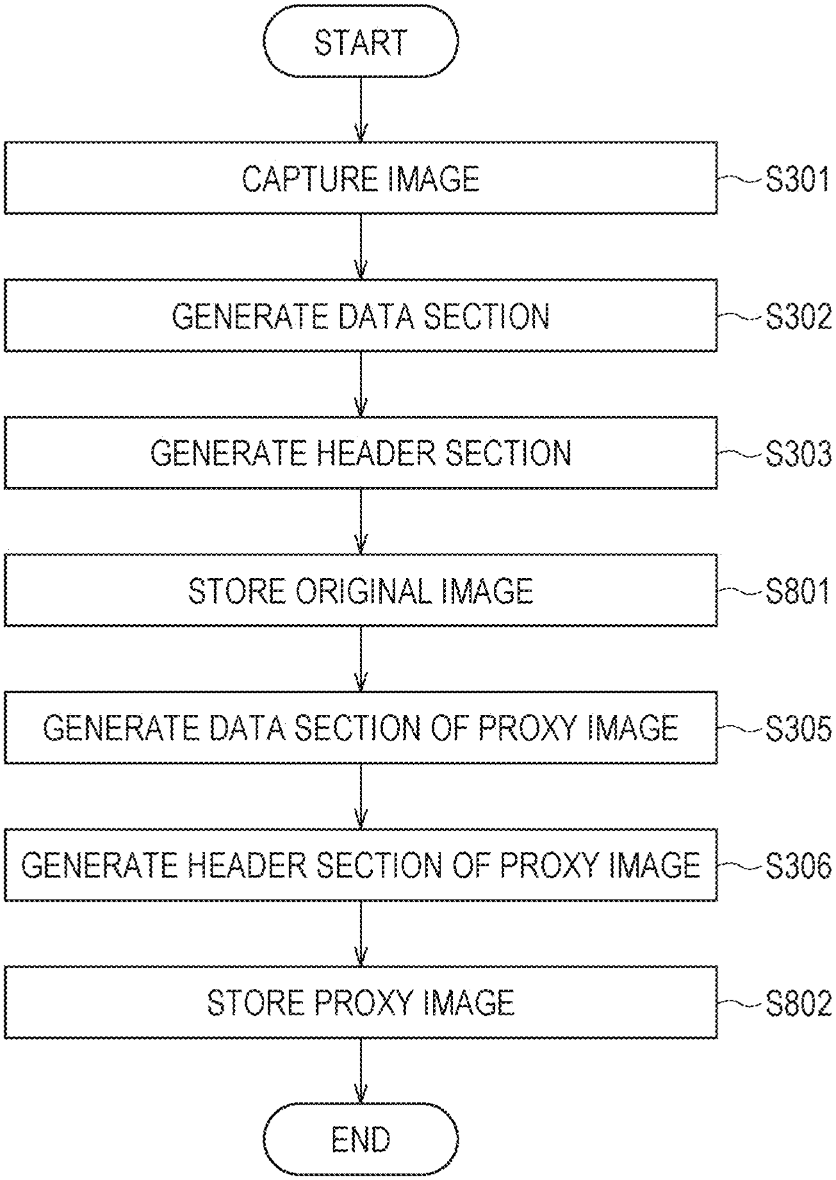
FIG. 14 is a flowchart illustrating an example of processing performed by the image capturing unit.

With reference to FIG. 14, an example of processing performed by the image capturing unit 601 will be described. Note that, in the example illustrated in FIG. 14, the same signs are assigned to processes that are substantially the same as those in the first embodiment described with reference to FIG. 8A, and detailed description of these processes will be omitted.

In S801, the image capturing unit 601 generates the image data of the original image by concatenating the data section of the original image and the header section of the original image, and stores the image data of the original image in the original image storage unit 603.

In S802, the image capturing unit 601 generates the image data of the proxy image by concatenating the data section of the proxy image and the header section of the proxy image and stores the image data of the proxy image in the proxy image storage unit 604, and the series of processes illustrated in FIG. 14 ends.

(Processing Performed by Transmission Information Generation Unit)

Figure 15A:
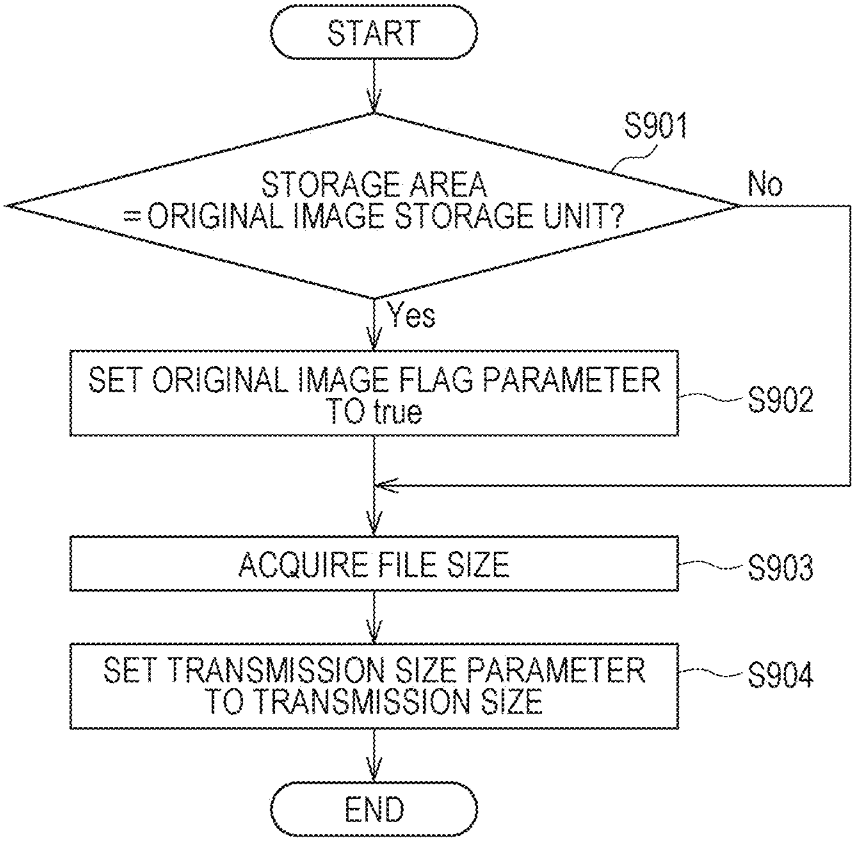
FIGS. 15A and 15B are flowcharts illustrating examples of processing performed by a transmission information generation unit.

With reference to FIG. 15A, an example of processing performed by the transmission information generation unit 605 will be described.

In S901, the transmission information generation unit 605 determines whether or not the storage area where the image data of a transmission target is stored is the original image storage unit 603.

In a case where the transmission information generation unit 605 determines in S901 that the storage area where the image data of the transmission target is stored is the original image storage unit 603, the process proceeds to S902.

In contrast, in a case where the transmission information generation unit 605 determines in S901 that the storage area where the image data of the transmission target is stored is not the original image storage unit 603, the process proceeds to S903.

In this case, the processing in S902 is skipped.

In S902, the transmission information generation unit 605 sets, to true, an original image flag parameter in transmission information (a transmission parameter) corresponding to the image data of the transmission target.

In S903, the transmission information generation unit 605 acquires the file size of the image data of the transmission target.

In S904, the transmission information generation unit 605 sets, to the file size acquired in S902 as a transmission size, a transmission size parameter in the transmission information (the transmission parameter) corresponding to the image data of the transmission target, and the series of processes illustrated in FIG. 15A ends.

Note that in S904, regarding the file size set as the transmission size in the transmission size parameter, in a case where one file is divided into a plurality of files and then transmitted, the transmission size may be set to the file size of each division file.

(Processing Performed by Image Management Apparatus)

Figure 16:
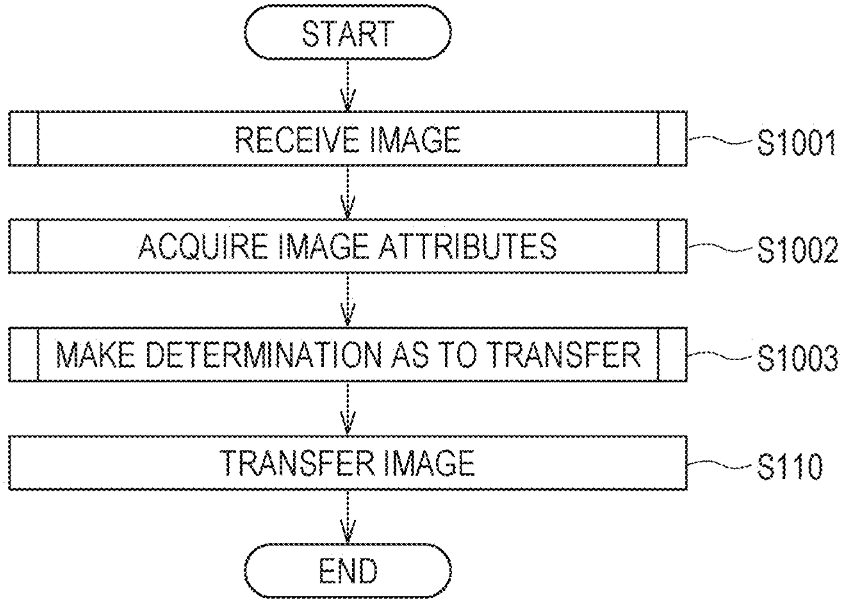
FIG. 16 is a flowchart illustrating an example of processing performed by the image management apparatus.

With reference to FIG. 16, an example of processing performed by the image management apparatus 102 will be described.

In S1001, the reception unit 611 receives, from the image capturing apparatus 101, image data and transmission information (a transmission parameter) corresponding to the image data. The processing performed by the reception unit 611 will be described in detail separately with reference to FIGS. 17A, 17B, and 18.

In S1002, the image attribute acquisition unit 612 acquires information indicating image attributes from the transmission information received in S1001 by the reception unit 611, associates the image data with the information indicating the image attributes received by the reception unit 611, and stores the received image data and the information indicating the image attributes in the image attribute retaining unit 613. The processing performed by the image attribute acquisition unit 612 will be described in detail separately with reference to FIGS. 18, 19A, and 19B.

In S1003, the determination unit 614 determines, on the basis of the information indicating the image attributes associated with the target image data, whether or not to transfer the image data. The processing performed by the determination unit 614 will be described in detail separately with reference to FIG. 20.

Thereafter, processing in S110 is performed. Note that the processing in S110 illustrated in FIG. 16 corresponds to the processing in S110 illustrated in FIG. 6.

(Processing Performed by Reception Unit)

Figure 17A:
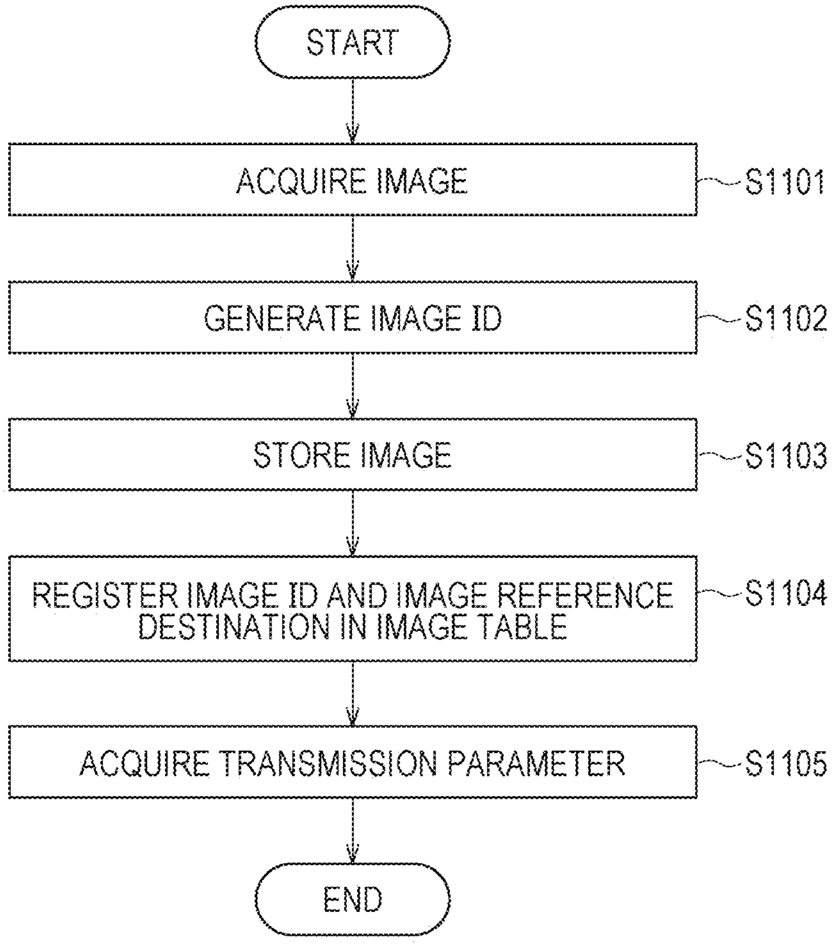
FIGS. 17A and 17B are flowcharts illustrating examples of processing performed by a reception unit.

With reference to FIG. 17A, an example of processing performed by the reception unit 611 will be described.

In S1101, the reception unit 611 receives image data transmitted from the image capturing apparatus 101.

In S1102, the reception unit 611 generates an image ID for uniquely identifying the image represented by the image data received in S1101.

In S1103, the reception unit 611 stores, in the retaining unit 512, the image data received in S1101.

In S1104, the reception unit 611 associates the image ID generated in S1102 with reference destination information indicating the reference destination of the image data in the retaining unit 512 and registers the image ID and the reference destination information in an image table 700. As a result, for example, the transfer unit 514 can identify the image data of the image to be transferred, on the basis of the reference destination information associated with the image ID of the image.

The configuration of the image table 700 will be described in detail separately with reference to FIG. 18.

In S1105, the reception unit 611 acquires the transmission information transmitted from the image capturing apparatus 101, and the series of processes illustrated in FIG. 17A ends.

(Configuration of Table)

With reference to FIG. 18, an example of the management table managed by the image management apparatus 102 according to the present embodiment will be described.

The image table 700 illustrates an example of a management table that the image management apparatus 102 uses to manage image data. For an image ID for uniquely identifying an image, an entry is stored in the image table 700. In the entry, reference destination information indicating the reference destination of the target image data in the retaining unit 512 is associated with an original image flag indicating whether or not the image represented by the image data is an original image. Such a configuration makes it possible, for example, to refer to the reference destination of the image data and the original image flag using the image ID as a key.

(Processing Performed by Image Attribute Acquisition Unit)

Figure 19A:
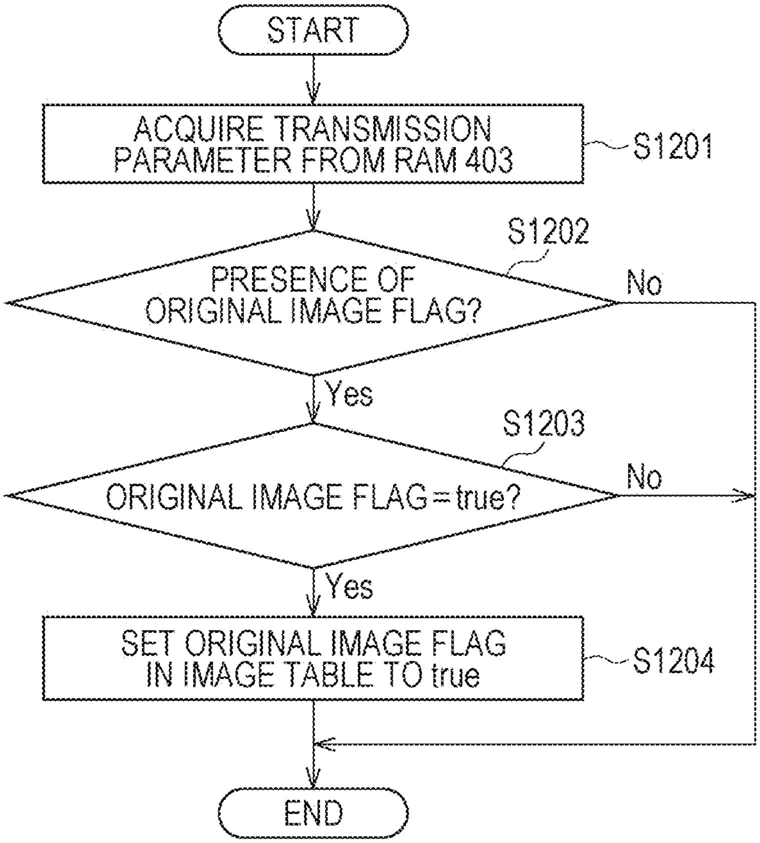
FIGS. 19A and 19B are flowcharts illustrating examples of processing performed by an image attribute acquisition unit.

With reference to FIG. 19A, an example of processing performed by the image attribute acquisition unit 612 will be described.

In S1201, the image attribute acquisition unit 612 acquires the transmission information (the transmission parameter) of target image data from the RAM 403.

In S1202, the image attribute acquisition unit 612 determines whether or not the transmission information acquired in S1201 includes an original image flag.

In a case where the image attribute acquisition unit 612 determines in S1202 that the transmission information includes an original image flag, the process proceeds to S1203.

In contrast, in a case where the image attribute acquisition unit 612 determines in S1202 that the transmission information does not include an original image flag, the series of processes illustrated in FIG. 19A ends.

In S1203, the image attribute acquisition unit 612 determines whether or not the original image flag included in the transmission information is true.

In a case where the image attribute acquisition unit 612 determines in S1203 that the original image flag included in the transmission information is true, the process proceeds to S1204.

In contrast, in a case where the image attribute acquisition unit 612 determines in S1203 that the original image flag included in the transmission information is not true, the series of processes illustrated in FIG. 19A ends.

In S1204, the image attribute acquisition unit 612 sets the original image flag included in the entry of the target image in the image table 700 to true, and the series of processes illustrated in FIG. 19A ends. More specifically, the image attribute acquisition unit 612 acquires the image ID of the target image from the RAM 403 and sets the value of the original image flag associated with the image ID in the image table 700 to true, and thereafter the series of processes illustrated in FIG. 19A ends.

(Processing Performed by Determination Unit)

Figure 20:
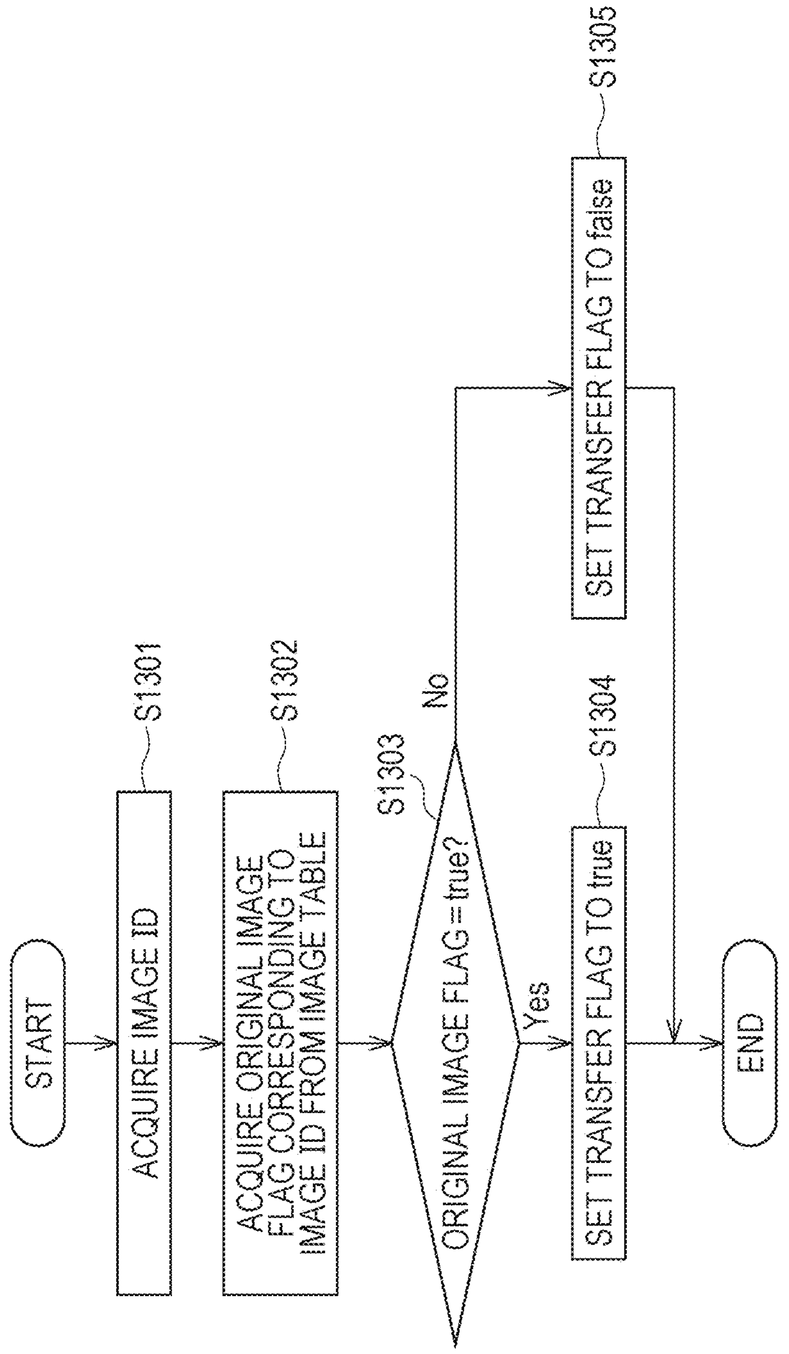
FIG. 20 is a flowchart illustrating an example of processing performed by a determination unit.

With reference to FIG. 20, an example of processing performed by the determination unit 614 will be described.

In S1301, the determination unit 614 acquires the image ID of a target image from the RAM 403.

In S1302, the determination unit 614 acquires, from the image table 700, the value of the original image flag associated with the image ID acquired in S1301.

In S1303, the determination unit 614 determines whether or not the value of the original image flag acquired in S1302 is true.

In a case where the determination unit 614 determines in S1303 that the value of the original image flag is true, the process proceeds to S1304.

In contrast, in a case where the determination unit 614 determines in S1303 that the value of the original image flag is not true, the process proceeds to S1305.

In S1304, the determination unit 614 sets the transfer flag of the target image to true, and the series of processes illustrated in FIG. 20 ends.

In contrast, in S1305, the determination unit 614 sets the transfer flag of the target image to false, and the series of processes illustrated FIG. 20 ends.

Note that an example of the case where information indicating an image type is included in a query parameter (transmission information) has been described in the embodiment described above; however, as long as it is possible for the image management apparatus 102 to recognize the image type of a certain target image, the method for reporting the image type is not limited to any particular method. For example, an endpoint for a case where the image management apparatus 102 receives image data may be associated with the image type of the image represented by the image data.

For example, suppose that "/xxx/upload/" is provided as an endpoint for a case where the image management apparatus 102 receives the image data of an original image, and "/xxx/upload/proxy/" is provided as an endpoint for a case where the image management apparatus 102 receives the image data of a proxy image.

When the image capturing apparatus 101 transmits the image data of an original image, the image capturing apparatus 101 may transmit the image data using "/xxx/upload/" as an endpoint. When the image capturing apparatus 101 transmits the image data of a proxy image, the image capturing apparatus 101 may transmit the image data using "/xxx/upload/proxy/" as an endpoint.

The image management apparatus 102 considers the image data transmitted via "/xxx/upload/" to be the image data of an original image and the image data transmitted via "/xxx/upload/proxy/" to be the image data of a proxy image.

Figure 17B:
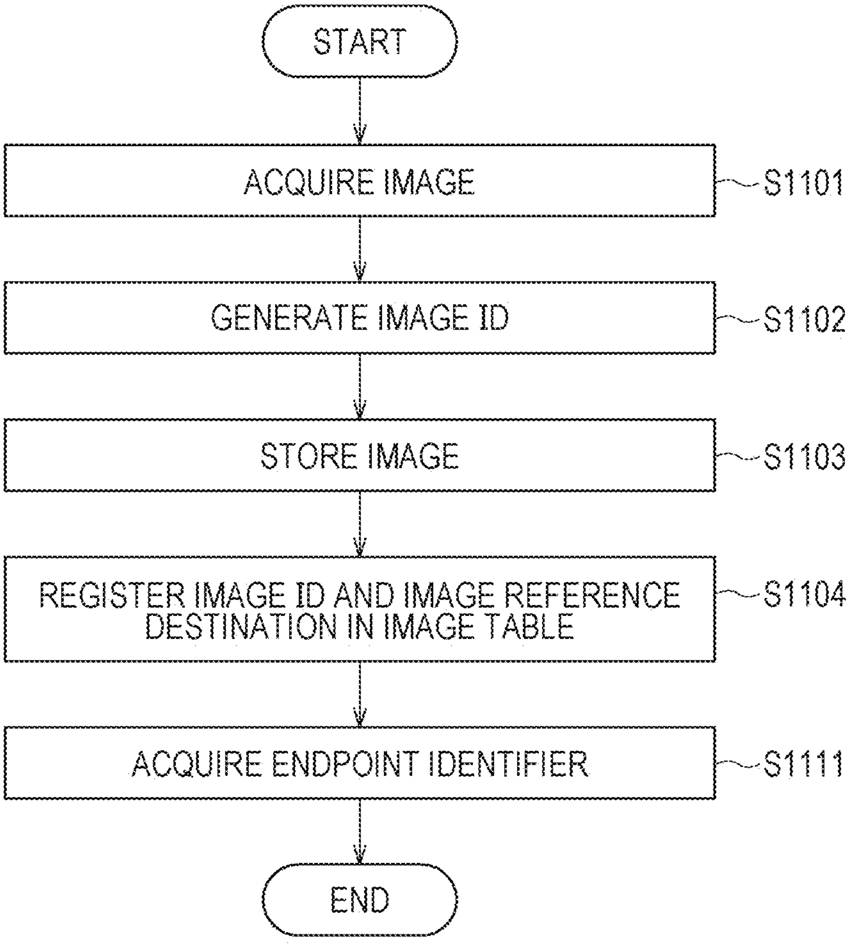

In a case where the configuration described above as an example is used, it is sufficient that the processing performed by the reception unit 611 be processing as illustrated in FIG. 17B. In the example illustrated in FIG. 17B, in S1111, the reception unit 611 acquires an endpoint identifier for identifying the endpoint that accepted the transmission of the image data, and the series of processes illustrated in FIG. 17B ends. As for the endpoint identifier to be acquired, for example, in a case where the endpoint that accepted the transmission of the image data is "/xxx/upload/", the character string of that endpoint is acquired. In a case where the endpoint that accepted the transmission of the image data is "/xxx/upload/proxy/", the character string of that endpoint is acquired.

Figure 19B:
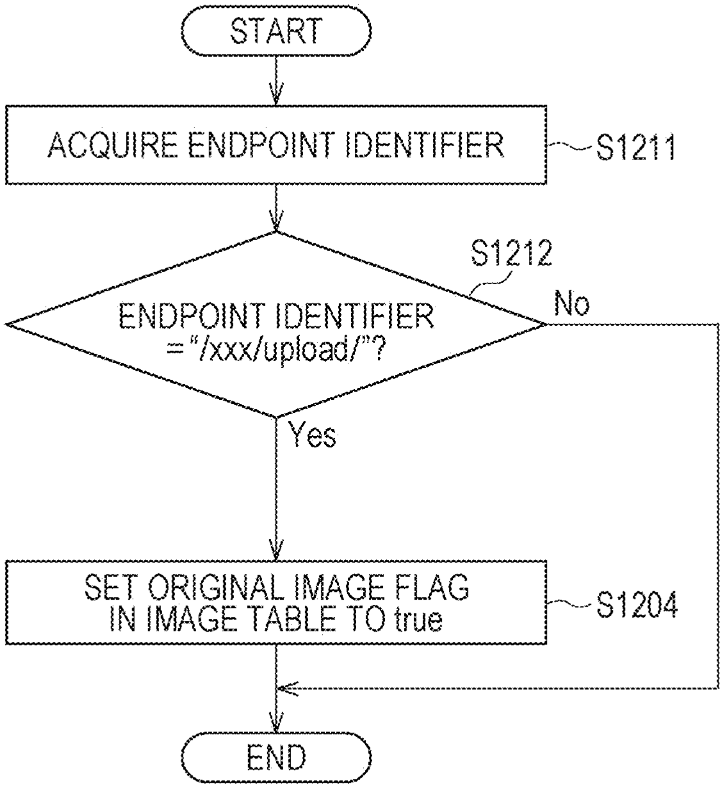

It is sufficient that the processing performed by the image attribute acquisition unit 612 be processing as illustrated in FIG. 19B.

Specifically, in S1211, the image attribute acquisition unit 612 acquires the endpoint identifier of a target image from the RAM 403.

In S1212, the image attribute acquisition unit 612 determines whether or not the endpoint identifier acquired in S1211 is an identifier associated with an original image. Specifically, in a case where the endpoint identifier is "/xxx/upload/", the image attribute acquisition unit 612 recognizes that the endpoint identifier is associated with an original image.

In a case where the image attribute acquisition unit 612 determines in S1212 that the endpoint identifier that is a target is an identifier associated with an original image, the process proceeds to S1204. Note that the processing in S1204 is similar to the example illustrated in FIG. 19A.

In contrast, in a case where the image attribute acquisition unit 612 determines in S1212 that the endpoint identifier that is a target is not an identifier associated with an original image, the series of processes illustrated in FIG. 19B ends.

Figure 15B:
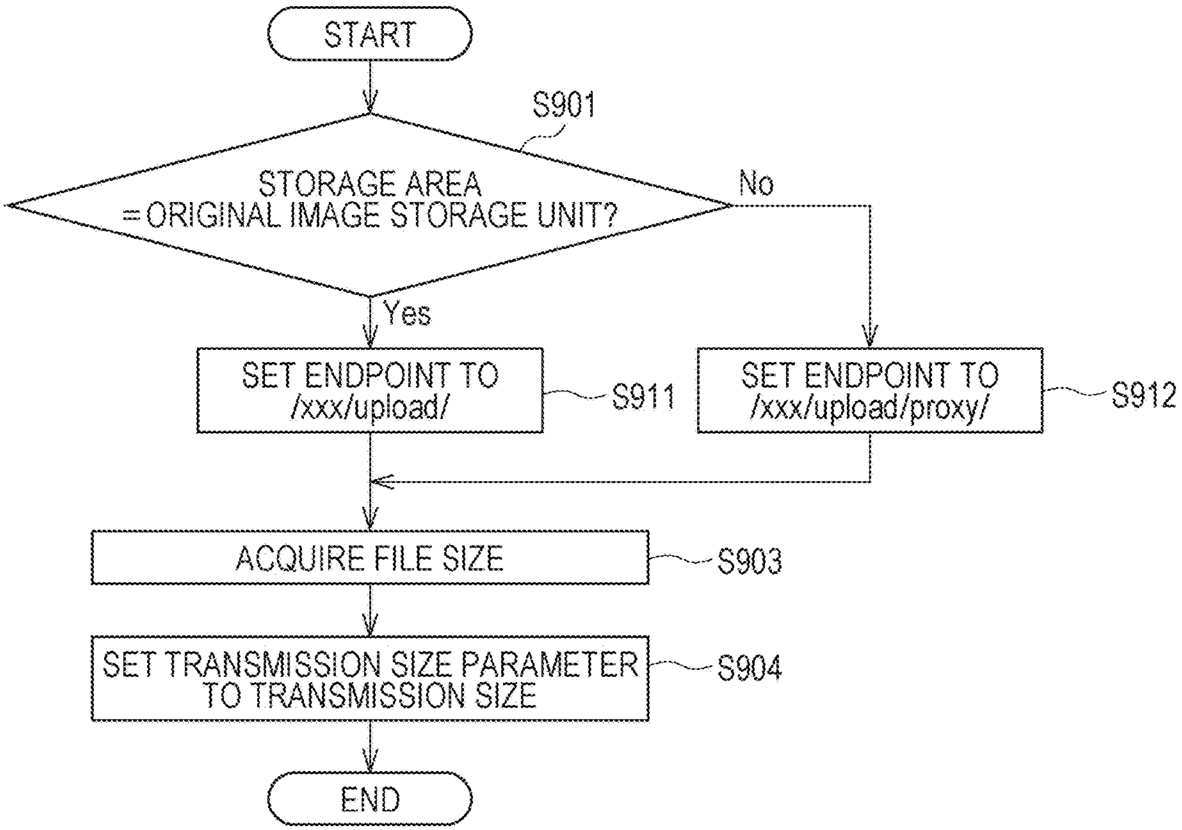

Moreover, it is sufficient that the transmission information generation unit 605 be configured to create different endpoints depending on the image type of the image represented by image data to be transmitted. Specifically, it is sufficient that the processing performed by the transmission information generation unit 605 be processing as illustrated in FIG. 15B.

Specifically, in S911, since the image data to be transmitted is the image data of an original image, the transmission information generation unit 605 sets, as an endpoint to be used, an endpoint identifier for transmission of the image data of an original image. That is, in this case, "/xxx/upload/" is set as an endpoint to be used.

In S912, since the image data to be transmitted is the image data of a proxy image, the transmission information generation unit 605 sets, as an endpoint to be used, an endpoint identifier for transmission of the image data of a proxy image. That is, in this case, "/xxx/upload/proxy/" is set as an endpoint to be used.

The use of the above-described configuration makes it possible to reduce the load of the query parameter analysis process in the image management apparatus 102, which is expected to have the effect of increasing the speed of receiving target image data when using a query parameter.

Note that, in the present embodiment, an example of the case has been described in which information indicating an image type is included in a query parameter when the image capturing apparatus 101 transmits image data; however, as long as it is possible to transmit information indicating an image type as transmission information, the method is not limited to any particular method. As a specific example, the image capturing apparatus 101 may cause information indicating an image type to be included in information to be transmitted before or after the transmission of the image data. In this manner, as long as information indicating an image type is included in transmission information to be transmitted in association with the transmission of the image data, the transmission method and transmission timing of that transmission information are not limited to any particular method and timing, for example.

As a specific example, a protocol may be used in which, before the image capturing apparatus 101 transmits image data, information indicating the attributes of the image represented by the image data to be transmitted is transmitted to the image management apparatus 102 and thereafter the image data is transmitted. It is sufficient that control be further performed so that information indicating the image type is included in the content of communication performed before the transmission of the image data. By using such a configuration, for example, the image management apparatus 102 can prepare, before the image data of a large capacity original image is transmitted, storage (for example, storage that can be accessed at high speed) that is more suitable for receiving such image data. Thus, it is possible to complete the reception of the image data of the original image in a shorter time than a case where the reception of the image data of the original image is started without notice.

As described above, the image type of an image transmitted from an external apparatus such as an image capturing apparatus is determined in the image management system 100 according to the present embodiment, and in a case where the image type of the image is determined to be an original image, the image is controlled to be transferred to the information management apparatus.

The use of such a configuration makes it possible to prevent a case from occurring in which, for example, a proxy image is transferred to the information management apparatus and a proxy image is further created from that proxy image.

Third Embodiment

In the following, a third embodiment of the present disclosure will be described. In the second embodiment described above, an example of the case has been described in which the image type of an image represented by image data is determined on the basis of transmission information transmitted for the reception of the image data, and the image data is transferred to a predetermined transfer destination in accordance with the result of the determination. In contrast, the present embodiment describes an example of a case where the image type of an image represented by received image data is determined on the basis of a model identifier for identifying the model of the image capturing apparatus 101 (hereinafter also referred to as a model ID) and attribute information regarding the image that is a target.

(Logical Configuration of Image Management System)

Figure 21:
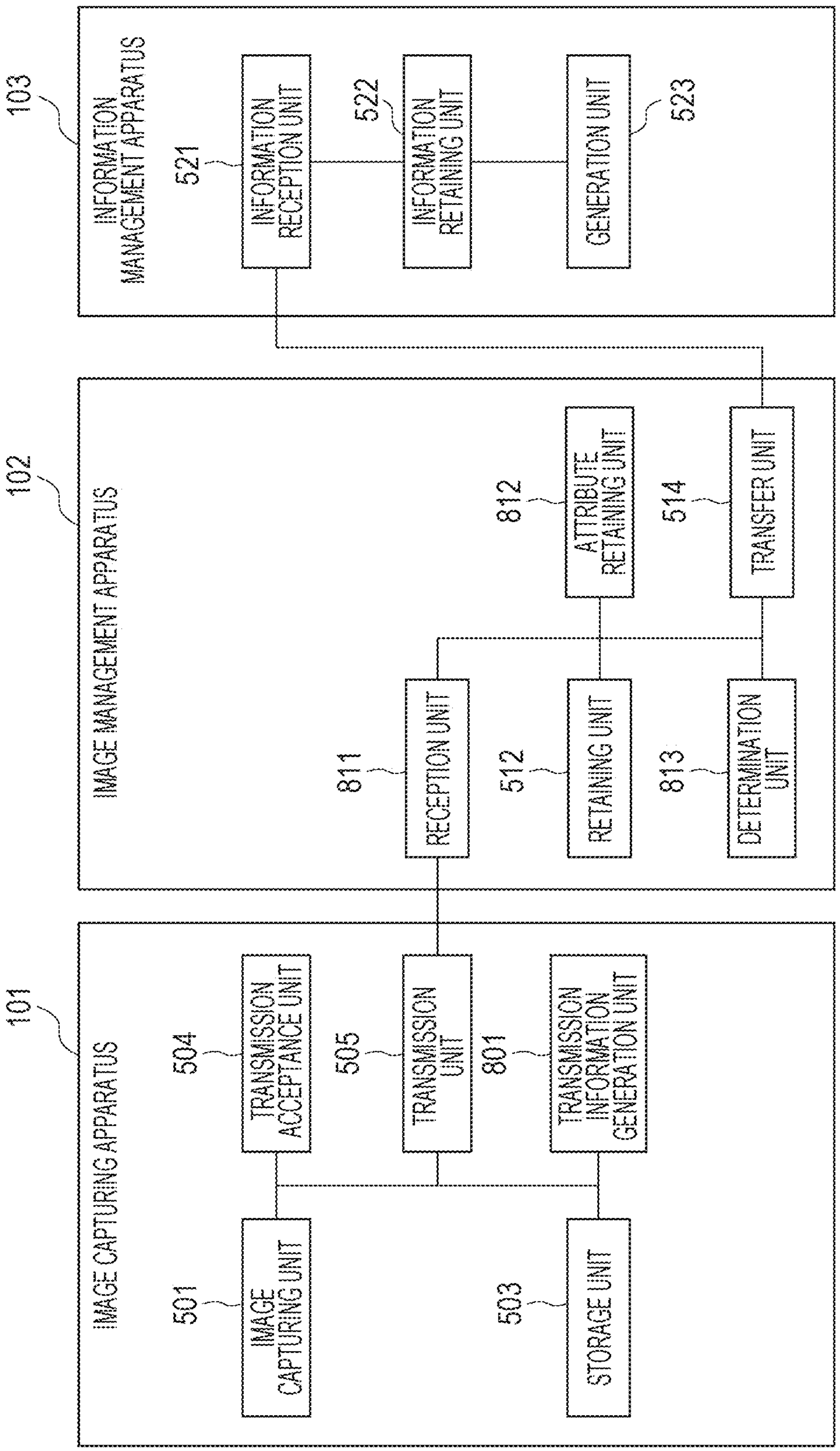
FIG. 21 is a diagram illustrating an example of the logical configuration of the image management system.

With reference to FIG. 21, an example of the logical configuration of the image management system 100 and the image management apparatus 102 according to the present embodiment will be described. Note that, in the example illustrated in FIG. 21, the same signs are assigned to constructional elements that are substantially the same as those in the first and second embodiments described with reference to FIGS. 5 and 12, and detailed description of these constructional elements will be omitted.

Logical Configuration of Image Capturing Apparatus 101

The logical configuration of the image capturing apparatus 101 for realizing various functions is realized, for example, by the CPU 301 loading the program(s) stored in the ROM 302 into the RAM 303 and performing processes according to the sequence diagram and flowcharts to be described below. The results of performing each process are retained in a storage area such as the RAM 303 or the like.

The image capturing apparatus 101 includes the image capturing unit 501, the storage unit 503, the transmission acceptance unit 504, a transmission information generation unit 801, and the transmission unit 505.

The transmission information generation unit 801 generates transmission information (a transmission parameter) for when image data is transmitted. The processing performed by the transmission information generation unit 801 will be described in detail separately with reference to FIG. 22.

Logical Configuration of Image Management Apparatus 102

The logical configuration of the image management apparatus 102 for realizing various functions is realized, for example, by the CPU 401 loading the program(s) stored in the ROM 402 into the RAM 403 and performing processes according to the sequence diagram and flowcharts to be described below. The results of performing each process are retained in a storage area such as the RAM 403 or the like.

The image management apparatus 102 includes a reception unit 811, the retaining unit 512, an attribute retaining unit 812, a determination unit 813, and the transfer unit 514.

The reception unit 811 receives image data transmitted from the image capturing apparatus 101 and the device ID of the image capturing apparatus 101. Device IDs are identifiers assigned to uniquely identify individual image capturing apparatuses (hereinafter also referred to as apparatus identifiers). A device ID is issued, for example, when the connection between the image capturing apparatus 101 and the image management apparatus 102 is set, and is transmitted from the image capturing apparatus 101 to the image management apparatus 102. Moreover, the device ID is retained in the RAM 303 or secondary storage device 306 of the image capturing apparatus 101. Note that the device ID may be stored in the ROM 302 of the image capturing apparatus 101. In this case, the device ID stored in the ROM 302 may be used.

The attribute retaining unit 812 retains an attribute table that represents the attribute values of proxy images that can be generated for each image capturing apparatus model. Note that the attribute table corresponds to an example of a "first management table".

The determination unit 813 determines, on the basis of the attribute values of proxy images that can be generated for each image capturing apparatus model and the attribute values of a received image, whether or not to transfer the image.

Note that the individual constructional elements of each of the image capturing apparatus 101, the image management apparatus 102, and the information management apparatus 103 may be realized by being distributed among a plurality of image capturing apparatuses and a plurality of information processing apparatuses. In a case where the functions of each of the image capturing apparatus 101, the image management apparatus 102, and the information management apparatus 103 are distributed among a plurality of image capturing apparatuses and a plurality of information processing apparatuses, the plurality of image capturing apparatuses and the plurality of information processing apparatuses are connected via a network, such as a LAN, so that communication is possible to and from each other and cooperate in the series of processes to be described below.

(Processing Performed by Transmission Information Generation Unit)

Figure 22:
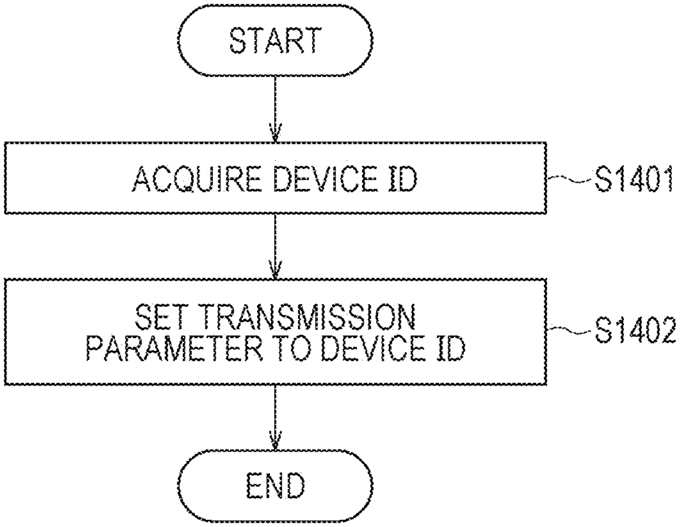
FIG. 22 is a flowchart illustrating an example of processing performed by the transmission information generation unit.

With reference to FIG. 22, an example of processing performed by the transmission information generation unit 801 will be described.

In S1401, the transmission information generation unit 801 acquires the device ID of the image capturing apparatus 101.

In S1402, the transmission information generation unit 801 sets, as a transmission parameter, the device ID acquired in S1401, and the series of processes illustrated in FIG. 22 ends.

(Processing Performed by Reception Unit)

Figure 23:
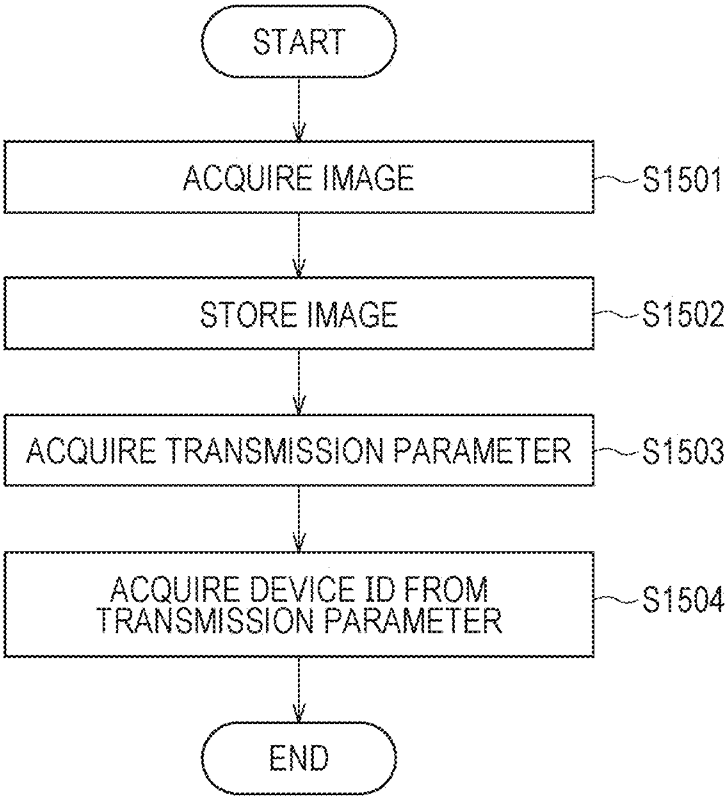
FIG. 23 is a flowchart illustrating an example of processing performed by the reception unit.

With reference to FIG. 23, an example of processing performed by the reception unit 811 will be described.

In S1501, the reception unit 811 acquires image data transmitted from the image capturing apparatus 101.

In S1502, the reception unit 811 stores the acquired image data in the retaining unit 512.

In S1503, the reception unit 811 acquires a transmission parameter transmitted from the image capturing apparatus 101.

In S1504, the reception unit 811 acquires a device ID from the transmission parameter acquired in S1503, and the series of processes illustrated in FIG. 23 ends.

(Processing Performed by Determination Unit)

Figure 24:
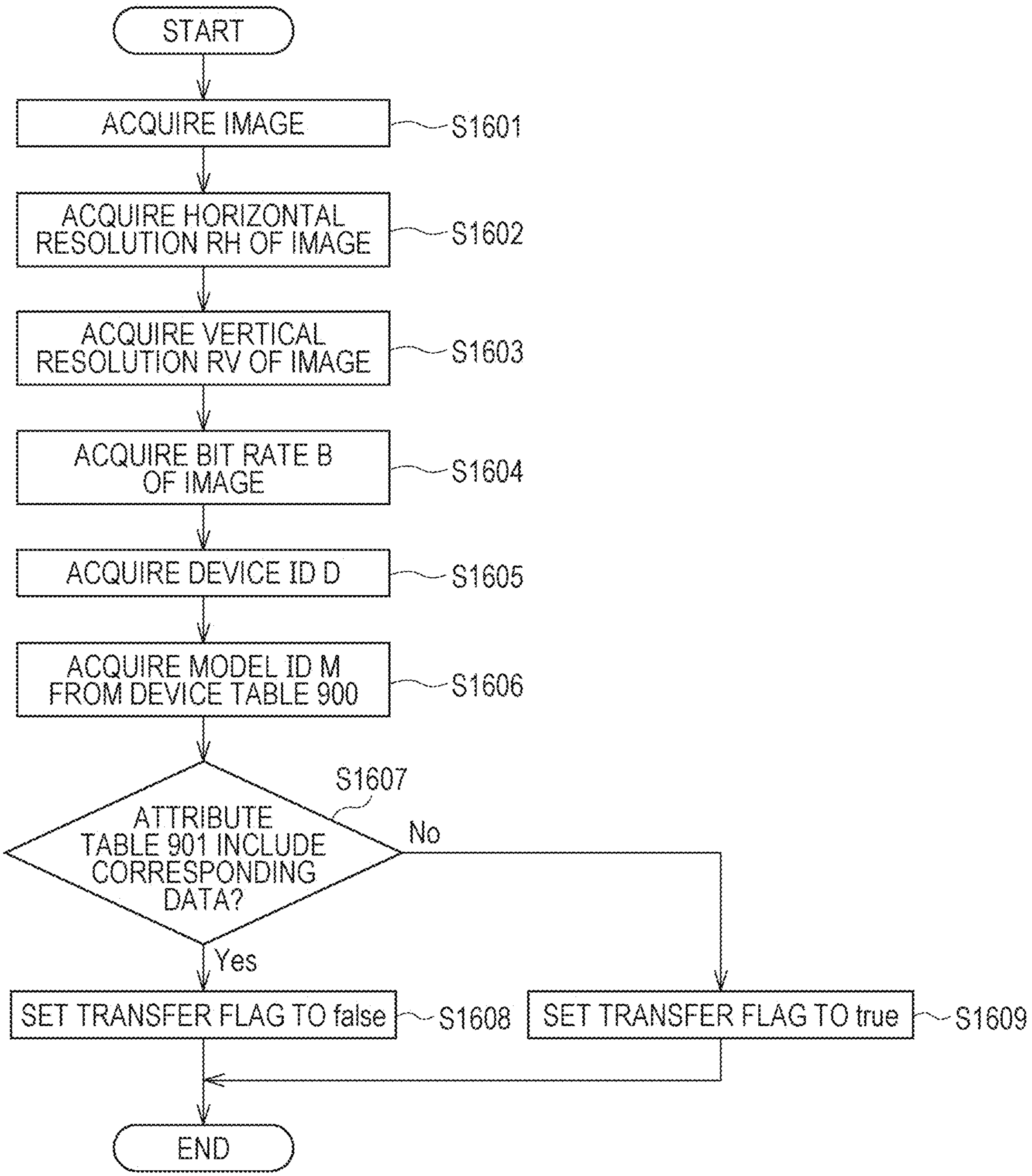
FIG. 24 is a flowchart illustrating an example of processing performed by a determination unit.

With reference to FIG. 24, an example of processing performed by the determination unit 813 will be described.

In S1601, the determination unit 813 acquires image data to be processed.

In S1602, the determination unit 813 acquires the value of the horizontal resolution of the image represented by the image data acquired in S1601 (hereinafter also simply referred to as the "image data to be processed"). For convenience, the value of the horizontal resolution acquired in this process will be denoted by RH in the following description.

In S1603, the determination unit 813 acquires the value of the vertical resolution of the image represented by the image data to be processed. For convenience, the value of the vertical resolution acquired in this process will be denoted by RV in the following description.

In S1604, the determination unit 813 acquires the value of the bit rate of the image represented by the image data to be processed. For convenience, the value of the bit rate acquired in this process will be denoted by B in the following description.

In S1605, the determination unit 813 acquires the device ID of a target image capturing apparatus. For convenience, the value of the device ID acquired in this process will be denoted by D in the following description.

In S1606, the determination unit 813 acquires, from a device table 900, the model ID corresponding to the device ID "D" acquired in S1605. For convenience, the value of the model ID acquired in this process will be denoted by M in the following description. Note that the device table 900 will be described in detail separately with reference to FIG. 25A. The device table 900 corresponds to an example of a "second management table".

In S1607, the determination unit 813 determines whether or not an attribute table 901 includes an entry in which the same model ID as the model ID "M" acquired in S1606 and the same attribute values as the attribute values of the image data acquired in S1601 are set. Specifically, the determination unit 813 makes the above-described determination by comparing the attribute values of the image acquired in S1602 to S1604 with the attribute values of the image set in the entry having the same model ID as the model ID "M" among the individual entries of the attribute table 901. In the case of the example illustrated in FIG. 24, the determination unit 813 operates each entry of the attribute table 901 on the basis of the attribute ID of the entry and determines whether or not an entry exists in which the value of the model ID is M, the value of the horizontal resolution is RH, the value of the vertical resolution is RV, and the value of the bit rate is B.

In a case where the determination unit 813 determines in S1607 that the attribute table 901 includes a target entry, the process proceeds to S1608.

In contrast, in a case where the determination unit 813 determines in S1607 that the attribute table 901 does not include a target entry, the process proceeds to S1609.

Note that the attribute table 901 will be described in detail separately with reference to FIG. 25B.

In S1608, the determination unit 813 sets the transfer flag to false, and the series of processes illustrated in FIG. 24 ends.

In S1609, the determination unit 813 sets the transfer flag to true, and the series of processes illustrated in FIG. 24 ends.

(Configuration of Management Table)

With reference to FIGS. 25A and 25B, examples of the management tables that the image management apparatus 102 according to the present embodiment uses to manage various types of information will be described.

The device table 900 illustrated in FIG. 25A corresponds to the device table 900 described together with the series of processes illustrated in FIG. 24 and is managed by the retaining unit 512. The device table 900 is a management table for managing the correspondence relationship between device IDs and model IDs, in other words, the correspondence relationship between image capturing apparatuses to which the devices ID are assigned and the models of those image capturing apparatuses. The device table 900 stores entries in each of which a device ID to be managed is associated with a model ID indicating the model of the image capturing apparatus corresponding to the device ID. With such a configuration, for example, by extracting the corresponding entry using a device ID as a key, it becomes possible to refer to the model ID corresponding to the model of the image capturing apparatus to which the device ID is assigned.

The attribute table 901 illustrated in FIG. 25B corresponds to the attribute table 901 described together with the series of processes illustrated in FIG. 24 and is managed by the attribute retaining unit 812. The attribute table 901 stores entries, in each of which an attribute ID is associated with a model ID and the horizontal resolution, vertical resolution, and bit rate of a proxy image. The attribute ID is identification information assigned to uniquely identify information on the attributes of a proxy image among proxy images that can be generated by the models of image capturing apparatuses. With such a configuration, for example, by extracting the corresponding entry using an attribute ID as a key, it becomes possible to refer to the model ID corresponding to the attribute ID and the horizontal resolution, vertical resolution, and bit rate of a proxy image.

Note that the device table 900 and the attribute table 901 are predefined, for example, by the management entity (for example, the operating organization) of the image management apparatus 102.

Note that, in the present embodiment, an example of the case has been described in which the image management apparatus 102 extracts the image attributes of a target image; however, the main entity that extracts the image attributes is not limited to any particular entity. As a specific example, the image capturing apparatus 101 may extract the image attributes of a target image.

Note that, in that case, it is sufficient that the processing in S1601 to S1604 illustrated in FIG. 24 be performed mainly by the image capturing apparatus 101 and that the series of pieces of information (information indicating the image attributes) extracted by the image capturing apparatus 101 through that processing be transmitted to the image management apparatus 102. It is sufficient that the determination unit 813 acquire the individual values of the image attributes from the information transmitted from the image capturing apparatus 101. By using such a configuration, the image management apparatus 102 does not have to perform the processing (for example, the processing in S1601 to S1604) regarding the extraction of the image attributes of the target image. Thus, the processing load of the series of processes performed by the determination unit 813 is reduced, which in turn has an effect in reducing the processing time for performing the series of processes by the determination unit 813.

Moreover, in the present embodiment, an example of the case has been described in which a model ID is determined from a device ID, and the attribute values of a proxy image that the model corresponding to the model ID can generate are determined; however, as long as the attribute values of a proxy image that a target model can generate can be determined, the method is not limited to any particular method. As a specific example, in a case where the determination unit 813 can directly recognize the model ID of a target image capturing apparatus, the attribute values of a proxy image that the model corresponding to that model ID can generate may be determined using that model ID. In this case, for example, an image capturing apparatus may transmit the model ID corresponding to its own model to the image management apparatus 102. The attribute table 901 can be configured to allow extraction, using the model ID as a key, of the attribute values of a proxy image that the target model can generate. The use of such a configuration makes it possible to reduce the number of times the management table is accessed, and thus the processing load for the determination unit 813 to perform the series of processes is reduced, which in turn is expected to have an effect in reducing the processing time for performing the series of processes by the determination unit 813.

Moreover, in the present embodiment, an example of the case has been described in which the attribute retaining unit 812 retains the attribute values of a proxy image (for example, a proxy video), and a determination as to whether or not the acquired image is an original image is made; however, as long as it is possible to determine whether or not the acquired image is an original image, the method is not limited to any particular method.

As a specific example, in a case where the attribute values of an original image are retained, whether or not an acquired image is an original image can be determined on the basis of the attribute values of the acquired image. In this case, for example, it is sufficient that the determination unit 813 determine whether or not the image represented by the acquired image data is an original image, in accordance with whether or not the attribute values of the image represented by the acquired image data match the retained attribute values of an original image. Specifically, in a case where the attribute values of the image represented by the acquired image data match the retained attribute values of an original image, it is sufficient that the determination unit 813 determine that the image represented by that image data is an original image. In a case where the attribute values of the image represented by the acquired image data do not match the retained attribute values of an original image, it is sufficient that the determination unit 813 determine that the image represented by that image data is not an original image. In particular, in a case where the number of types of attribute values in original images is relatively small, the use of such a configuration makes it possible to reduce the number of times the attribute table is searched. Thus, the processing load for the determination unit 813 to perform the series of processes is reduced, which in turn has an effect in reducing the processing time for performing the series of processes by the determination unit 813.

As described above, in the image management system 100 according to the present embodiment, the image type of an image transmitted from an external apparatus such as the image capturing apparatus is determined, and in a case where the image type of the image is determined to be an original image, the image is controlled to be transferred to the information management apparatus.

The use of such a configuration makes it possible to prevent a case from occurring in which, for example, a proxy image is transferred to the information management apparatus and a proxy image is further created from that proxy image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2023-093148, filed on Jun. 6, 2023, which is hereby incorporated by reference herein in its entirety.

What is claimed is:

1. An image management apparatus comprising:

one or more memories storing programs; and one or more processors, that upon execution of the stored programs is configured to operate as:

a determination unit configured to determine a type of a target image represented by image data transmitted from an external apparatus based on transmission information transmitted from the external apparatus in association with the target image, wherein the transmission information includes at least attribute information indicating a property of the target image; and a transfer unit configured to transfer, in a case where the type of the target image determined by the determination unit is an original image, the image data of the target image to an information management apparatus configured to generate, from an input image, a proxy image having a smaller amount of data than the input image, wherein the one or more memories stores a first management table including at least one an entry, having, in association with one another, a model identifier, a type of an image that an image capturing apparatus corresponding to the model identifier corresponding to a model of an image capturing apparatus that has captured the target image is capable of capturing, and the attribute information regarding an image corresponding to the type, and wherein the determination unit is configured to compare the model identifier and attribute information corresponding to the model of the image capturing apparatus that has captured the target image with the model identifier and attribute information included in the entry retained in the first management table to determine the type of the target image with which the transmission information is associated.

2. The image management apparatus according to claim 1, wherein the attribute information includes at least one of a horizontal resolution of the target image, a vertical resolution of the target image, and a bit rate of the target image.

3. The image management apparatus according to claim 1, wherein the transmission information includes at least the model identifier corresponding to the model of the image capturing apparatus that has captured the target image, and the determination unit is configured to determine based on the model identifier and the attribute information included in the transmission information, the type of the target image.

4. The image management apparatus according to claim 1, wherein entries in which apparatus identifiers for uniquely identifying individual image capturing apparatuses are associated with model identifiers corresponding to models of the image capturing apparatuses are retained in a second management table stored in the one or more memories, the transmission information includes at least an apparatus identifier used to uniquely identify the image capturing apparatus that has captured the target image, and the model identifier corresponding to the model of the image capturing apparatus that has captured the target image is determined by comparing the apparatus identifier included in the transmission information with the apparatus identifiers included in the entries retained in the second management table.

5. The image management apparatus according to claim 1, wherein the transmission information includes at least information indicating the type of the target image.

6. The image management apparatus according to claim 1, wherein the determination unit is configured to determine the type of the target image based on accompanying information assigned to the target image.

7. The image management apparatus according to claim 6, wherein the accompanying information includes at least partial information to which information indicating the type of the target image is assigned, out of an identification name of the target image, part of the identification name of the target image, a prefix of the identification name of the target image, and a suffix of the identification name of the target image excluding an extension and a delimiter of the identification name of the target image, the accompanying information accompanying the target image, information regarding a manufacturer's note area included in the accompanying information of the target image, predetermined information embedded in an image data section of the target image, information regarding a watermark area of the target image, and information regarding an alpha channel area of the target image.

8. The image management apparatus according to claim 1, wherein an image identifier used to identify the target image transmitted from the external apparatus, reference destination information indicating a reference destination of the image data of the target image, and information indicating the type of the target image are associated with each other and retained, and at least either the reference destination of the image data of the target image or the type of the target image is determined based on the image identifier.

9. The image management apparatus according to claim 8, wherein in a case where the type of the target image associated with the image identifier is the original image, the transfer unit transfers, to the information management apparatus, the image data of the target image indicated by the reference destination information associated with the image identifier.

10. The image management apparatus according to claim 1, wherein the type of the target image is any one of an original image, a proxy image, and a secondary image.

11. An image management system comprising:

a terminal device; and an image management apparatus configured to transfer image data transmitted from the terminal device to an information management apparatus configured to generate, from an input image, a proxy image having a smaller amount of data than the input image, wherein the image management apparatus includes one or more memories storing programs, and one or more processors, that upon execution of the stored programs is configured to operate as a determination unit configured to determine a type of a target image represented by the image data transmitted from the terminal device based on transmission information transmitted from the external apparatus in association with the target image, wherein the transmission information includes at least attribute information indicating a property of the target image, and a transfer unit configured to transfer, in a case where the type of the target image determined by the determination unit is an original image, the image data of the target image to the information management apparatus, wherein the one or more memories stores a first management table including at least one an entry, having, in association with one another, a model identifier, a type of an image that an image capturing apparatus corresponding to the model identifier corresponding to a model of an image capturing apparatus that has captured the target image is capable of capturing, and the attribute information regarding an image corresponding to the type, and wherein the determination unit is configured to compare the model identifier and attribute information corresponding to the model of the image capturing apparatus that has captured the target image with the model identifier and attribute information included in the entry retained in the first management table to determine the type of the target image with which the transmission information is associated.

12. The image management system according to claim 11, wherein the terminal device includes one or more memories storing programs and one or more processors that, upon execution of the stored programs, causes the terminal device to operate as a generation unit configured to generate, in association with the target image, transmission information including information regarding the type of the target image, and the determination unit is configured to determine the type of the target image based on the transmission information transmitted from the terminal device in association with the target image.

13. The image management system according to claim 12, wherein the generation unit is configured to determine the type of the target image based on a storage area where the image data of the target image is stored in the terminal device, and to generate the transmission information including information indicating the type of the target image corresponding to a result of the determination.

14. The image management system according to claim 11, wherein the terminal device includes one or more memories storing programs and one or more processors that, upon execution of the stored programs, causes the terminal device to operate as an assignment unit configured to assign, to the target image, accompanying information including information indicating the type of the target image, and the determination unit is configured to determine the type of the target image based on the accompanying information assigned to the target image.

15. An image management apparatus control method comprising:

determining a type of a target image represented by image data transmitted from an external apparatus based on transmission information transmitted from the external apparatus in association with the target image, wherein the transmission information includes at least attribute information indicating a property of the target image;

transferring, in a case where the type of the target image determined in the determining is an original image, the image data of the target image to an information management apparatus configured to generate, from an input image, a proxy image having a smaller amount of data than the input image; and wherein a first management table is stored in one or more memories that includes at least one an entry, having, in association with one another, a model identifier, a type of an image that an image capturing apparatus corresponding to the model identifier corresponding to a model of an image capturing apparatus that has captured the target image is capable of capturing, and the attribute information regarding an image corresponding to the type; wherein the method further includes comparing the model identifier and attribute information corresponding to the model of the image capturing apparatus that has captured the target image with the model identifier and attribute information included in the entry retained in the first management table to determine the type of the target image with which the transmission information is associated.

16. A non-transitory storage medium storing a program causing an image management apparatus to execute a control method, the control method comprising:

determining a type of a target image represented by image data transmitted from an external apparatus based on transmission information transmitted from the external apparatus in association with the target image, wherein the transmission information includes at least attribute information indicating a property of the target image;

transferring, in a case where the type of the target image determined in the determining is an original image, the image data of the target image to an information management apparatus configured to generate, from an input image, a proxy image having a smaller amount of data than the input image; and wherein a first management table is stored in one or more memories that includes at least one an entry, having, in association with one another, a model identifier, a type of an image that an image capturing apparatus corresponding to the model identifier corresponding to a model of an image capturing apparatus that has captured the target image is capable of capturing, and the attribute information regarding an image corresponding to the type; wherein the method further includes comparing the model identifier and attribute information corresponding to the model of the image capturing apparatus that has captured the target image with the model identifier and attribute information included in the entry retained in the first management table to determine the type of the target image with which the transmission information is associated.

* * * * *